(12) United States Patent
Lee et al.

(10) Patent No.: US 8,917,387 B1
(45) Date of Patent: Dec. 23, 2014

(54) FINGERPRINT SENSING APPARATUS

(71) Applicant: SecuGen Corporation, Santa Clara, CA (US)

(72) Inventors: Dong Won Lee, San Jose, CA (US); Winnie Ahn, Palo Alto, CA (US); Jae Ho Kim, San Jose, CA (US)

(73) Assignee: SecuGen Corporation, Santa Clara, CA (US)

( * ) Notice: Subject to any disclaimer, the term of this patent is extended or adjusted under 35 U.S.C. 154(b) by 0 days.

(21) Appl. No.: 14/463,062

(22) Filed: Aug. 19, 2014

Related U.S. Application Data

(60) Provisional application No. 62/008,242, filed on Jun. 5, 2014.

(51) Int. Cl.
*G06K 9/74* (2006.01)
*G06K 9/00* (2006.01)
*H04N 5/359* (2011.01)

(52) U.S. Cl.
CPC .......... *G06K 9/0004* (2013.01); *G06K 9/00087* (2013.01); *H04N 5/359* (2013.01)
USPC .......................................................... 356/71

(58) Field of Classification Search
None
See application file for complete search history.

(56) References Cited

U.S. PATENT DOCUMENTS 8,254,641 B2 * 8/2012 Kishima ....................... 382/115
2004/0252867 A1 * 12/2004 Lan et al. ....................... 382/124

* cited by examiner

*Primary Examiner* — Kara E Geisel
*Assistant Examiner* — Amanda Merlino
(74) *Attorney, Agent, or Firm* — Silicon Valley Patent Group LLP; Thomas Chan

(57) ABSTRACT

Methods and Apparatuses are provided for a thin high contrast optical acquisition system for fingerprint recognition. In one embodiment, an apparatus for determining validity of a fingerprint includes a light refracting device (light refractor), a light source, a light collecting device, and a controller.

The light refracting device can, for example, be a TFT light panel structure or an active matrix organic light emitting diode (AMOLED) panel structure with reverse current measurement and amplification circuitry, and includes an imaging surface and a viewing plane. Incident light from the light source is projected directly or indirectly onto the imaging surface to create an image of the patterned object from the projected light onto the viewing plane. The apparatus is configured to have a thin form factor, which may be flexible or conformable, compared to conventional optical fingerprint acquisition apparatuses.

21 Claims, 23 Drawing Sheets

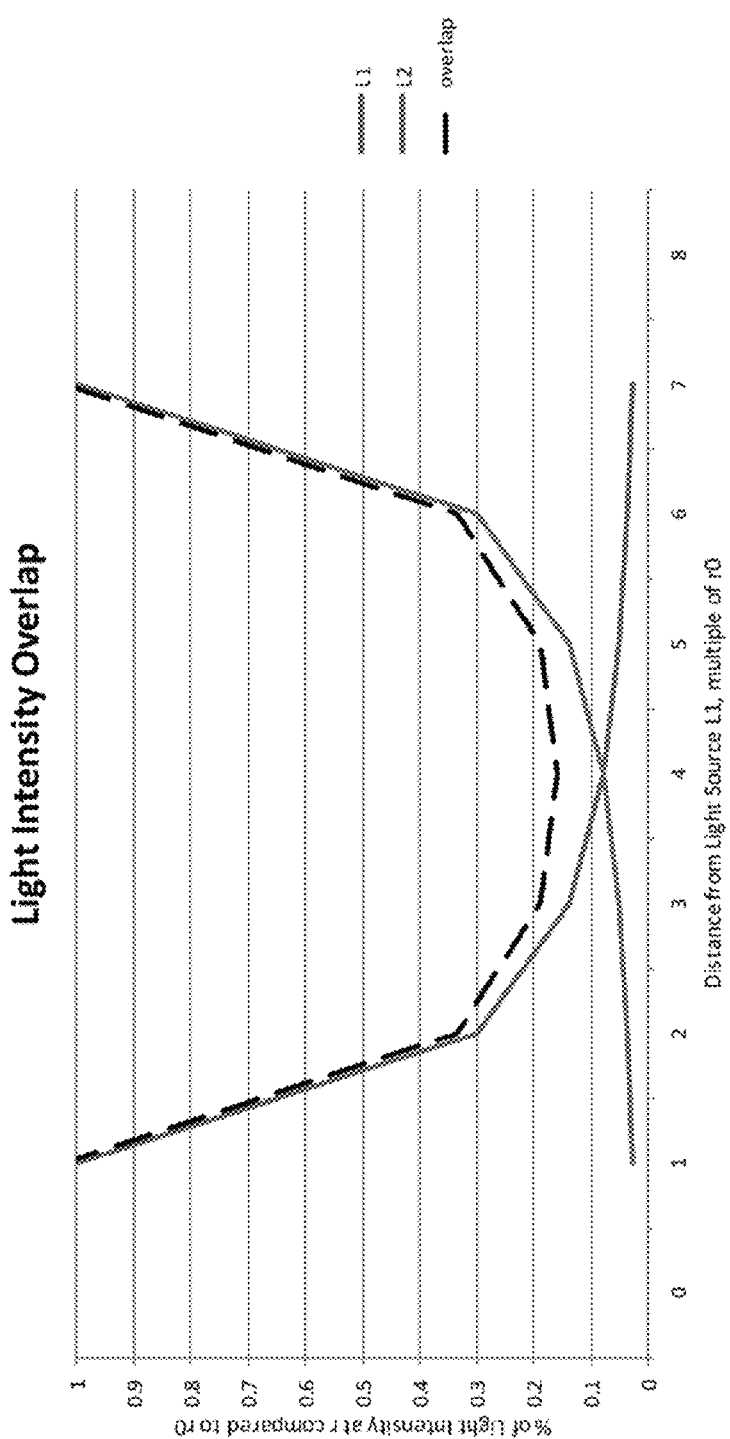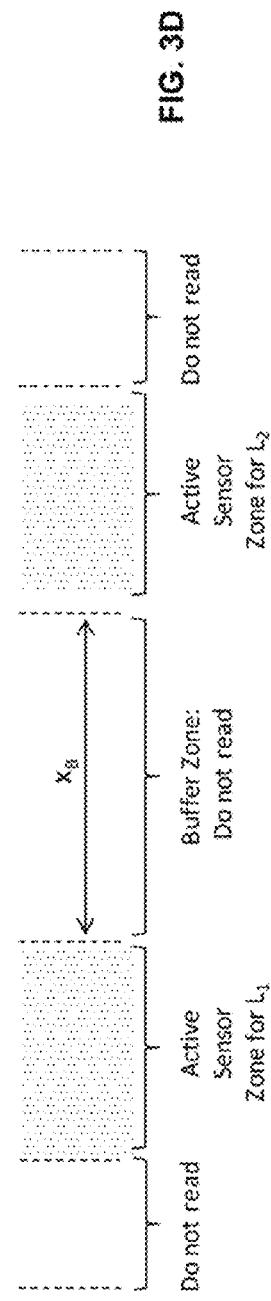
FIG. 3D

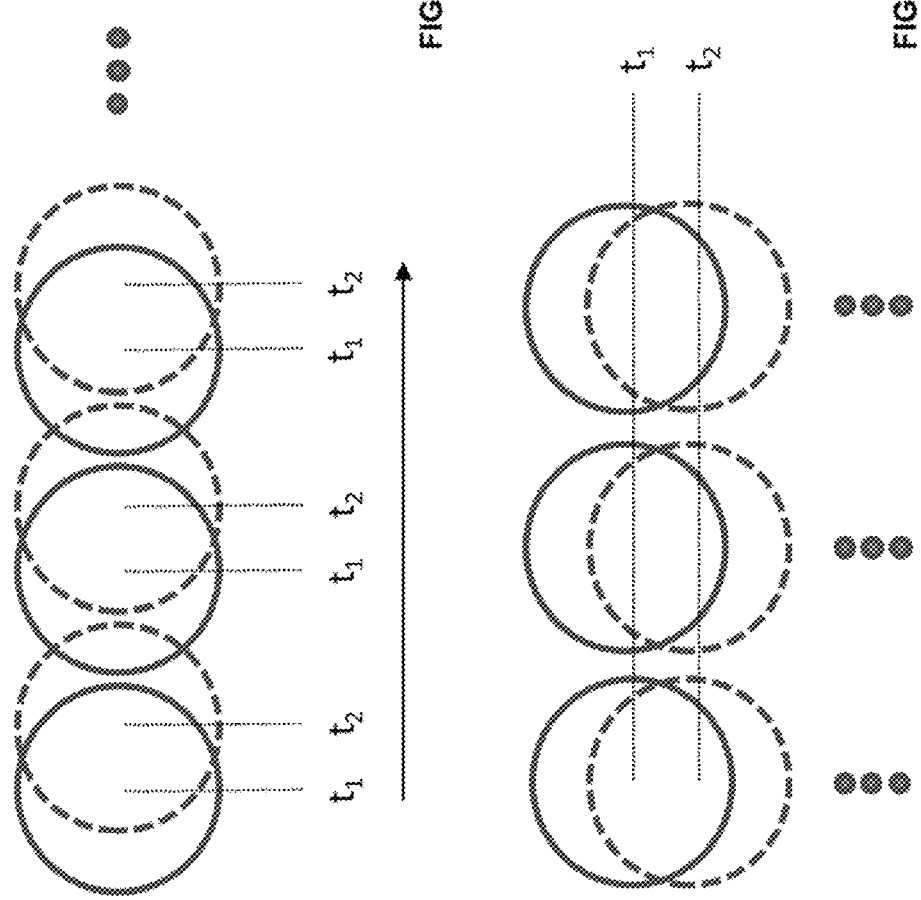

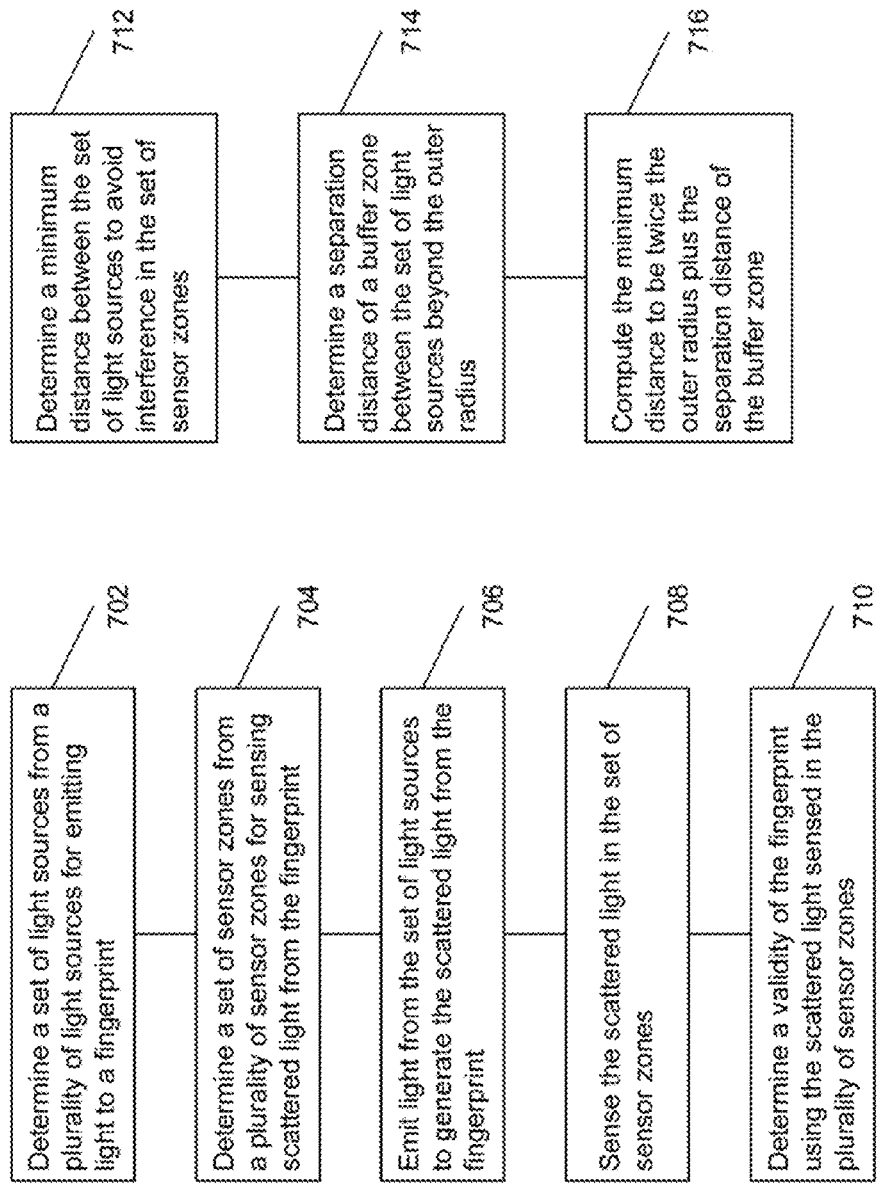

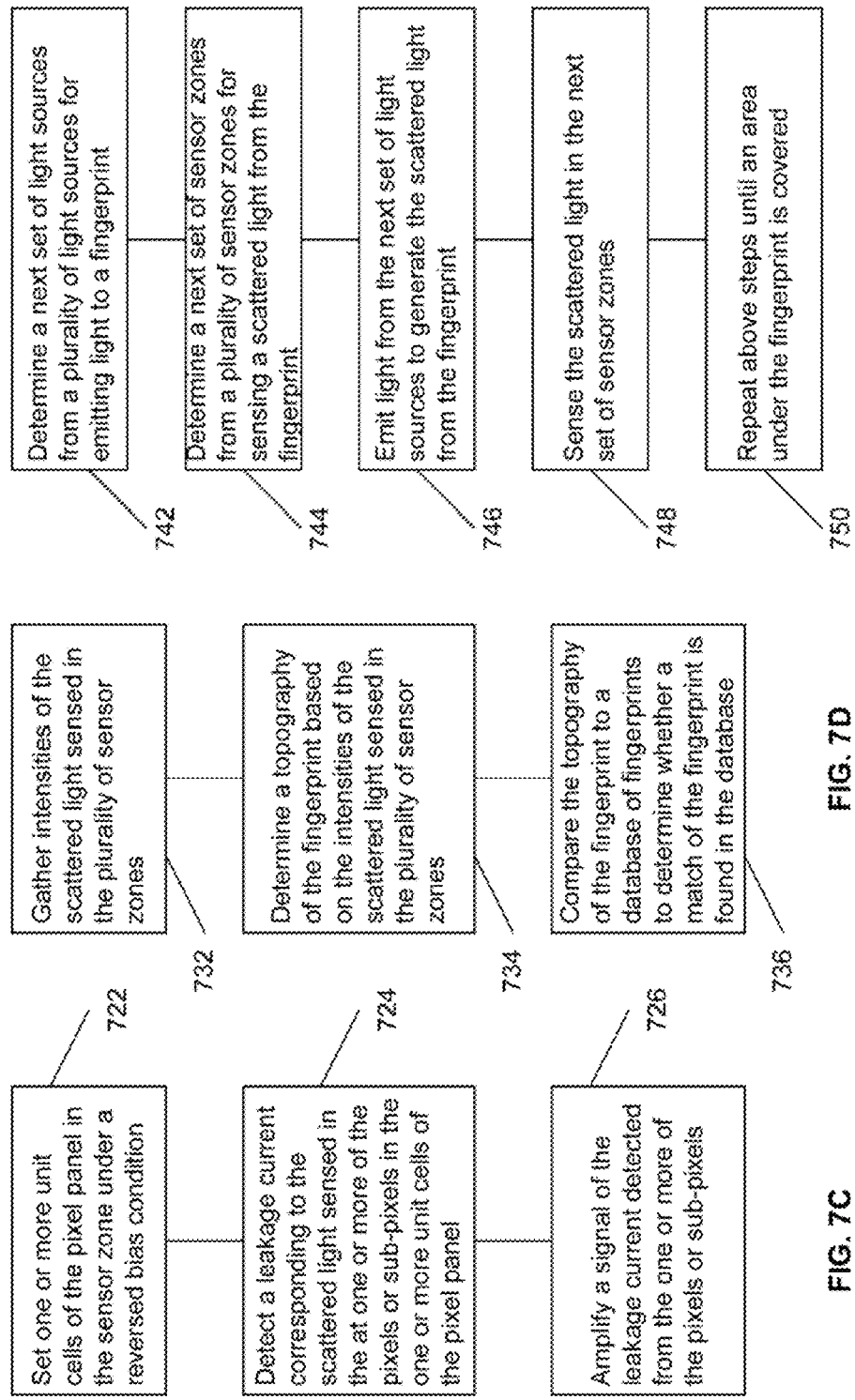

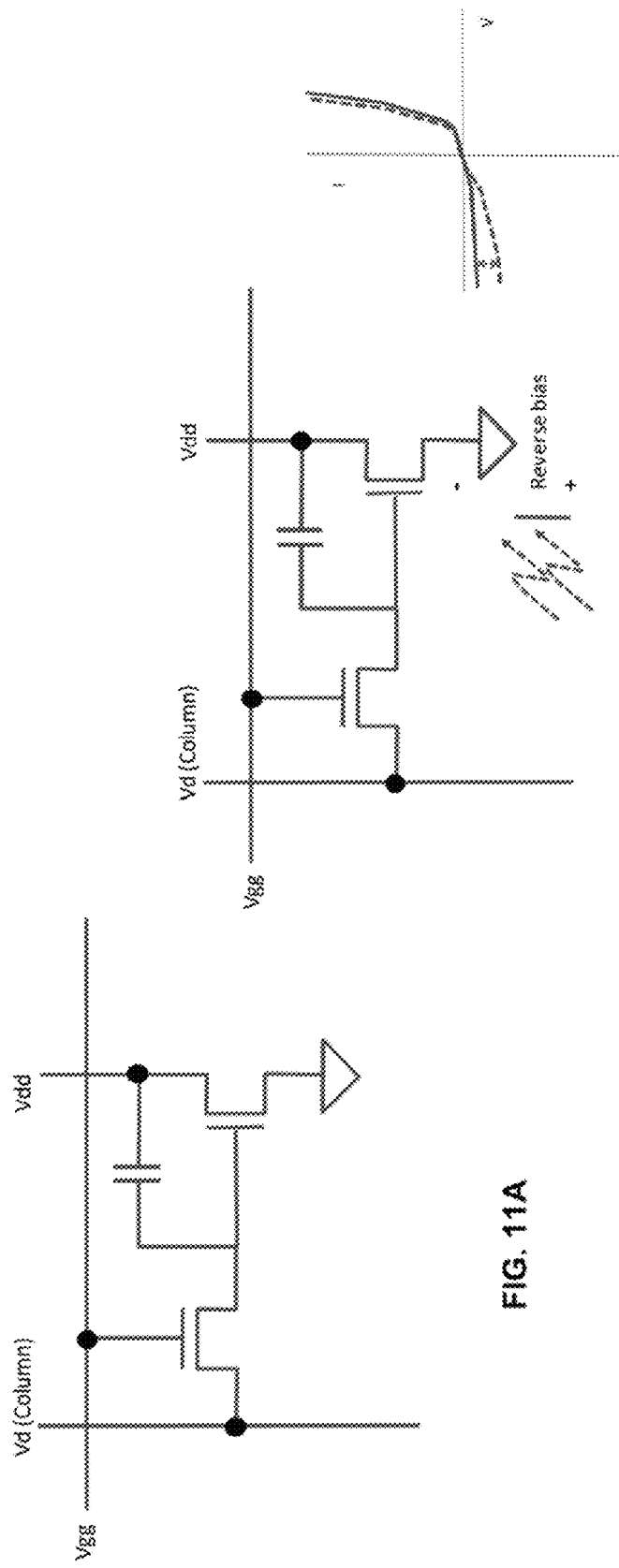

FINGERPRINT SENSING APPARATUS

CROSS REFERENCE TO RELATED APPLICATIONS

This application claims the benefit of U.S. provisional application No. 62/008,242, "Fingerprint Sensing Apparatus," filed Jun. 5, 2014, assigned to the assignee hereof. The aforementioned United States application is hereby incorporated by reference in its entirety.

FIELD

The present invention relates to the field of fingerprint detection system. In particular, the present invention relates to a thin high contrast optical acquisition system for fingerprint recognition.

BACKGROUND

Various fingerprint recognition devices have been used for commercial and military applications. Many of such conventional fingerprint recognition devices focus on matching patterns of a captured fingerprint to an existing database of fingerprint samples. If a match is found, the fingerprint is deemed to be valid, but if a match is not found, the fingerprint is deemed to be invalid.

Applications developed for mobile devices and platforms usually require secure electronic transactions, and fingerprint recognition is starting to play an important role for making such transactions more secure as well as convenient. One of the drawbacks of using conventional fingerprint recognition devices for mobile applications is that their physical form factor is not suitable for mobile devices and mobile platforms. Either the device must be attached to the mobile device or embedded within the device. Conventional optical fingerprint acquisition devices can be bulky and it can be challenging to seamlessly integrate with mobile devices.

Therefore, it is desirable to have a thin high contrast optical acquisition system for fingerprint recognition that can address the above issues of conventional fingerprint recognition devices.

SUMMARY

Methods and systems are provided for a fingerprint sensing apparatus. In one embodiment, a method for determining validity of a fingerprint includes determining a set of light sources from a plurality of light sources for emitting light to a fingerprint, determining a set of sensor zones from a plurality of sensor zones for sensing scattered light from the fingerprint, determining a minimum distance between a sensor zone and a light source for sensing selective scattered light from the fingerprint, emitting light from the set of light sources to generate the scattered light from the fingerprint, sensing the scattered light in the set of sensor zones, and determining a validity of the fingerprint using the scattered light sensed in the plurality of sensor zones.

In another embodiment, an apparatus for determining validity of a fingerprint includes a light refracting device (light refractor), a light source, a light collecting device, and a controller. The light refracting device can, for example, be an active matrix organic light emitting diode (AMOLED) panel structure with reverse current measurement and amplification circuitry, and includes an imaging surface and a viewing plane. Incident light from the light source is projected directly or indirectly onto the imaging surface to create an image of the patterned object from the projected light onto the viewing plane. The apparatus is configured to have a thin form factor, which may be flexible or conformable, compared to conventional optical fingerprint acquisition apparatuses. The AMOLED panel includes the light source panel as well as light collecting devices. The fingerprint sensing apparatus can be implemented as an in-cell structure.

In another embodiment, an apparatus for determining validity of a fingerprint includes a light refracting device (light refractor), a light source, a light collecting device, and a controller. The light refracting device can, for example, be a thin-film transistor (TFT) panel and includes an imaging surface, a light receiving surface, a viewing plane, and light collecting devices. The light source can be an individually addressable panel of discrete light sources, for example, a liquid crystal display (LCD) panel or an AMOLED panel. Incident light from the light source is projected through the light receiving surface and projected directly or indirectly onto the imaging surface to create an image of the patterned object from the projected light onto the viewing plane. The apparatus is configured to have a thin form factor, which may be flexible or conformable, compared to conventional optical fingerprint acquisition apparatuses. The TFT panel could be implemented as an add-on panel that is placed on top of the light source panel.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the figures.

FIG. 3D illustrates a plot of light intensity overlap for the example of FIG. 3C according to aspects of the present disclosure.

FIG. 6A illustrates an exemplary implementation of scanning a fingerprint according to embodiments of the present disclosure. FIG. 6B illustrates another exemplary implementation of scanning a fingerprint according to embodiments of the present disclosure.

FIG. 7A illustrates a method of capturing and validating a fingerprint image; FIG. 7B illustrates a method of determining a set of light sources from a plurality of light sources for emitting light to a fingerprint; FIG. 7C illustrates a method of sensing scattered light in a set of sensor zones; FIG. 7D illustrates a method of determining a validity of the fingerprint using the scattered light sensed in a plurality of sensor zones; and FIG. 7E illustrates a further method of capturing and validating the fingerprint image of FIG. 7A according to aspects of the present disclosure.

FIG. 11A illustrates an exemplary subpixel circuit cell with forward bias according to aspects of the present disclosure; FIG. 11B illustrates an exemplary subpixel circuit cell with reverse bias according to aspects of the present disclosure.

DESCRIPTION OF EMBODIMENTS

Methods and systems are provided for fingerprint sensing apparatus. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1B:
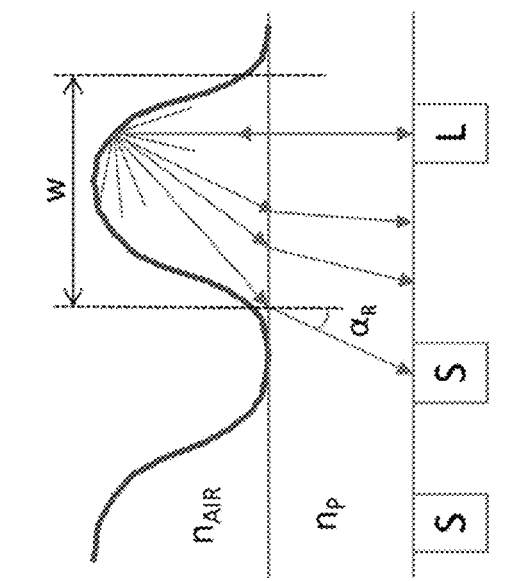
FIG. 1B illustrates light characteristics based on illumination of a valley of a fingerprint according to aspects of the present disclosure.
Figure 1A:
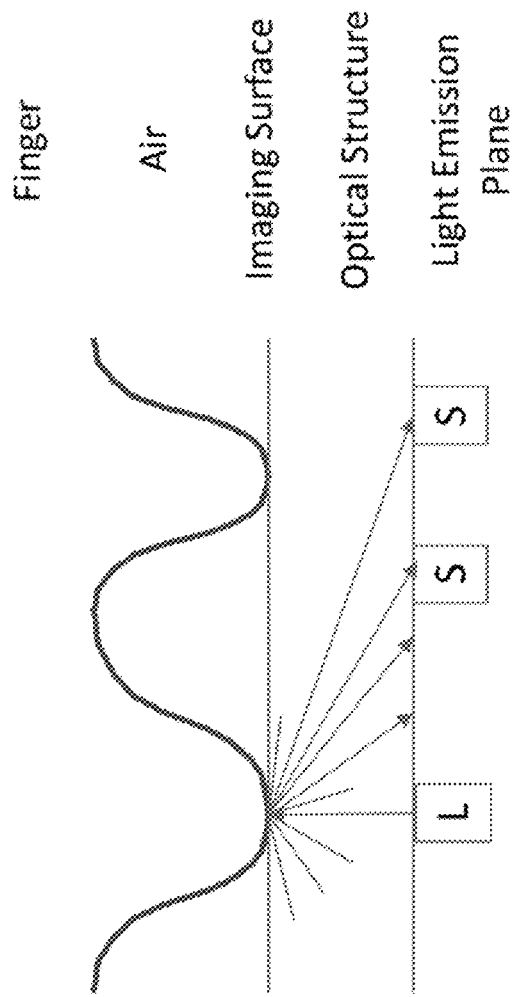
FIG. 1A illustrates light characteristics based on illumination of a ridge of a fingerprint according to aspects of the present disclosure.

The drawing of the fingerprint acquisition apparatus, as a pixel panel, in FIG. 1A shows incident light traveling from a light source component L in the light emission plane, through an optical structure to the imaging surface, and from the imaging surface to a light collecting (sensor) component S in the light emission plane. Incident light interacts with a finger placed on the imaging surface and is reflected, refracted, or scattered from the imaging surface. The pixel panel is configured so that there are multiple lighting pixels, to serve as discrete light sources, and multiple sensor pixels, to receive light carrying fingerprint image information. The light components used as light sources or sensors can be either pixels or subpixels that are arranged in an addressable pattern in the light emission plane. The pixel panel can be a display panel or non-display panel but is not limited LED or TFT-type display panels.

For a TFT type of light refractor implemented as an add-on panel, although the light source components are located in the light source panel below the light refractor, the light emission plane can be considered as the same plane as the light collecting plane because the transparent areas of the cells of the TFT panel are aligned with the transparent areas of the cells of the light source panel. For an LED type of light refractor implemented in-cell, both the light emission plane and light collecting plane are one and the same.

The following sections describe how fingerprint images can be captured according to aspects of the present disclosure. In one approach, light is projected from one light source L onto the imaging surface at an incident angle that is less than the critical angle at the light refractor/air interface. When incident light strikes the imaging surface where a finger is placed, it will get scattered by both ridges and valleys albeit to differing degrees and intensities. Ridges will scatter light across a wider range of angles compared to the valleys. More specifically, light scattered from ridges will hit the emission plane over a larger area compared to the area hit by light scattered from valleys. The sensor zone of the present disclosure can be determined in view of the characteristics of the light scattered, and it can be configured to differentiate the light scattered by the two topographical features.

Figure 4A:
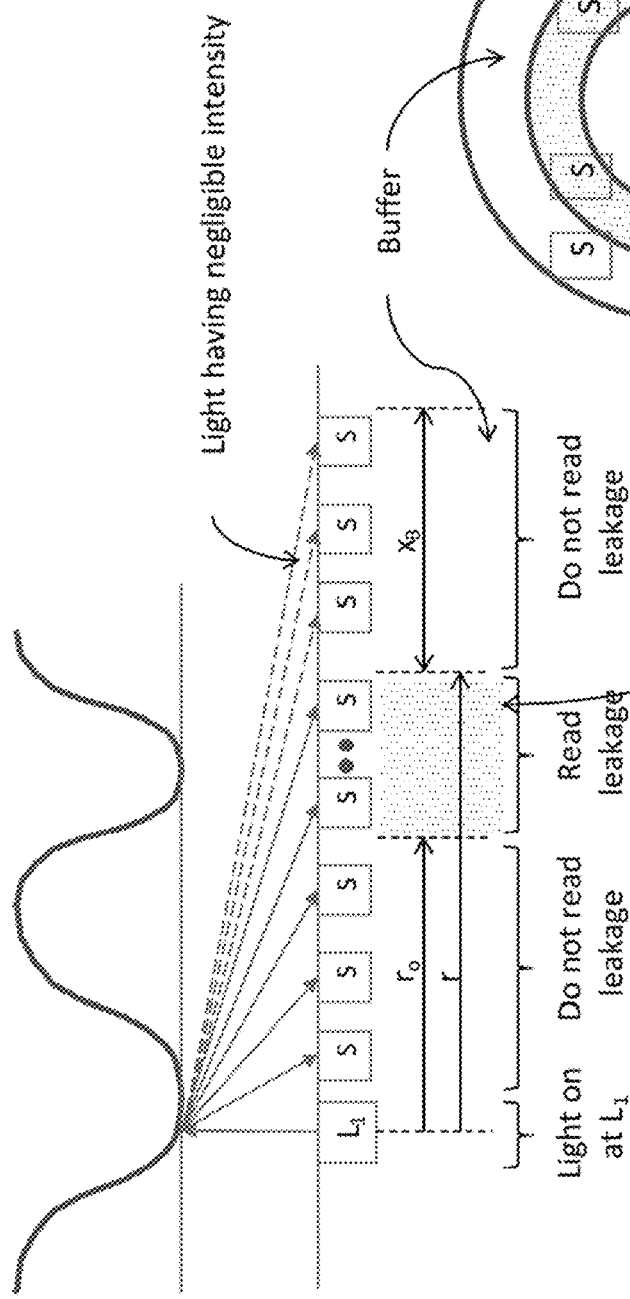
FIG. 4A illustrates a side view of the exemplary method of FIG. 3A according to aspects of the present disclosure.

The difference in scattering range is due to the presence of air where there are valleys at the imaging surface. Since the angle of incident light is less than the critical angle, light passes out of the pixel panel, through the imaging surface into the air, strikes the valley, scatters, re-enters the pixel panel, and refracts. Because of the refraction, valleys scatter light onto the emission plane within a smaller area than that of the ridges (for example, within radius $r_0$ as shown in FIG. 4A). Both valleys and ridges can scatter light into the same small area; there is no differentiation between light scattered from ridges and valleys, therefore, light is not collected in the small area close to the light source. But the ridges can scatter light outside of the small area; therefore, light is collected outside of the small area. The pixel panel provides a plurality of sensors across a controllable area to gather the well-differentiated light that is used to generate high-contrast fingerprint images.

In the example shown in FIG. 1A, the light strikes where a ridge is touching the imaging surface. Part of the incident light is absorbed by the ridge while the rest of the light is scattered towards the light emission plane. A sensor S receives a ray of the scattered light. The intensity of light received by the sensor S is assigned to the position that corresponds to the point of illumination by incident light from the light source L. The image of ridges will appear bright.

In the example shown in FIG. 1B, the light strikes the surface where there is a valley. The light passes through the surface and strikes the valley. Part of the light is absorbed by the valley while the rest of the light is scattered. Part of the scattered light re-enters the optical structure through the imaging surface and is refracted having an angle $\alpha_R$ normal to the imaging surface. A ray of refracted light hits the light emission plane at a distance x from the light source. This distance x is limited by the critical angle at the light refractor/air interface; x also depends on the depth of the valley and the thickness of the optical structure (th). Beyond a certain distance from the light source, x(max), no light will be refracted onto the light emission plane because the angle of refraction is limited by the critical angle. Stray light might reach beyond x(max) but it can be ignored as its intensity would be negligible. The intensity of light received by the sensor S is assigned to the position that corresponds to the point of illumination by incident light from the light source L; therefore, a sensor located beyond x(max) would register an image of the valley as being dark.

To distinguish between a fingerprint ridge or valley using a single light source L, the optical imaging apparatus can be configured to address individual, multiple, or regions of pixels such that when L is activated. All sensors S may be located within a predetermined distance from L at $x_S$, e.g. $x_S<x(max)$, can be ignored, not used, or turned off, and at least one sensor S may be located at a predetermined distance from L at $x_S$, e.g. $x_S>x(max)$, can be turned on, and incoming light is collected; such a sensor is called an active sensor. The active sensor will receive light scattered only from a ridge because no light scattered from a valley can be refracted by the optical structure beyond the critical angle, or beyond the distance x(max) except for negligible stray light. The following paragraphs describe a method to calculate a value for x(max) where there is a valley at the point of illumination.

After incident light passes through the imaging surface, it strikes the valley in air and scatters. Some of this scattered light re-enters the optical structure at a distance x(air) from the axis of the original incident light and refracts in the optical structure, making an angle, $\alpha_R$, normal to the imaging surface. X(max) can be computed as: x(max)=x(air)+thickness (th)*tan($\alpha_R$).

The largest possible value for $\alpha_R$ is the critical angle at the light refractor/air interface, although $\alpha_R$ is likely to be smaller than the critical angle in practice. The largest value for x(air) is approximately the width of the valley w. Therefore, x(max) may be estimated as with the following expression: x(max)= w+thickness*tan(critical angle).

The fingerprint acquisition apparatus can be designed to have a larger x(max) to reduce detection of stray light, which would reduce the sensitivity but would be offset by greater clarity and differentiation of fingerprint ridges and valleys. In some applications, however, a smaller x(max) can be chosen to boost sensitivity without lowering contrast to intolerable levels. Since the width of a valley can vary from one point of illumination to another, in some other applications, a large enough value of x(max) is estimated to cover the possible range of valley widths that may be encountered in such applications. If there are two or more active sensors, the intensity of light received by one sensor can be compared with that received by another sensor to calculate an overall brightness that corresponds to the point of illumination.

The measured or calculated intensities of light received from various points of illumination can be assembled to map out the topography of the fingerprint corresponding to each point of illumination. Brighter areas indicate higher elevation (e.g. ridges) while darker areas indicate lower elevation (e.g. valleys).

According to aspects of the present disclosure, scattered light could be collected at a large distance beyond x (max). But it may not be practical to do so too far away for the following reasons: (a) the light intensity drops the farther away from the point of illumination, which would reduce sensitivity; (b) excessive redundant data would be generated, which would waste storage and processing resources; and/or (c) it may be advantageous to use a plurality of simultaneous light sources to speed up data collection. For faster scanning of a whole fingerprint, one approach is to illuminate more than one point from more than one light source at a time.

Figure 2:
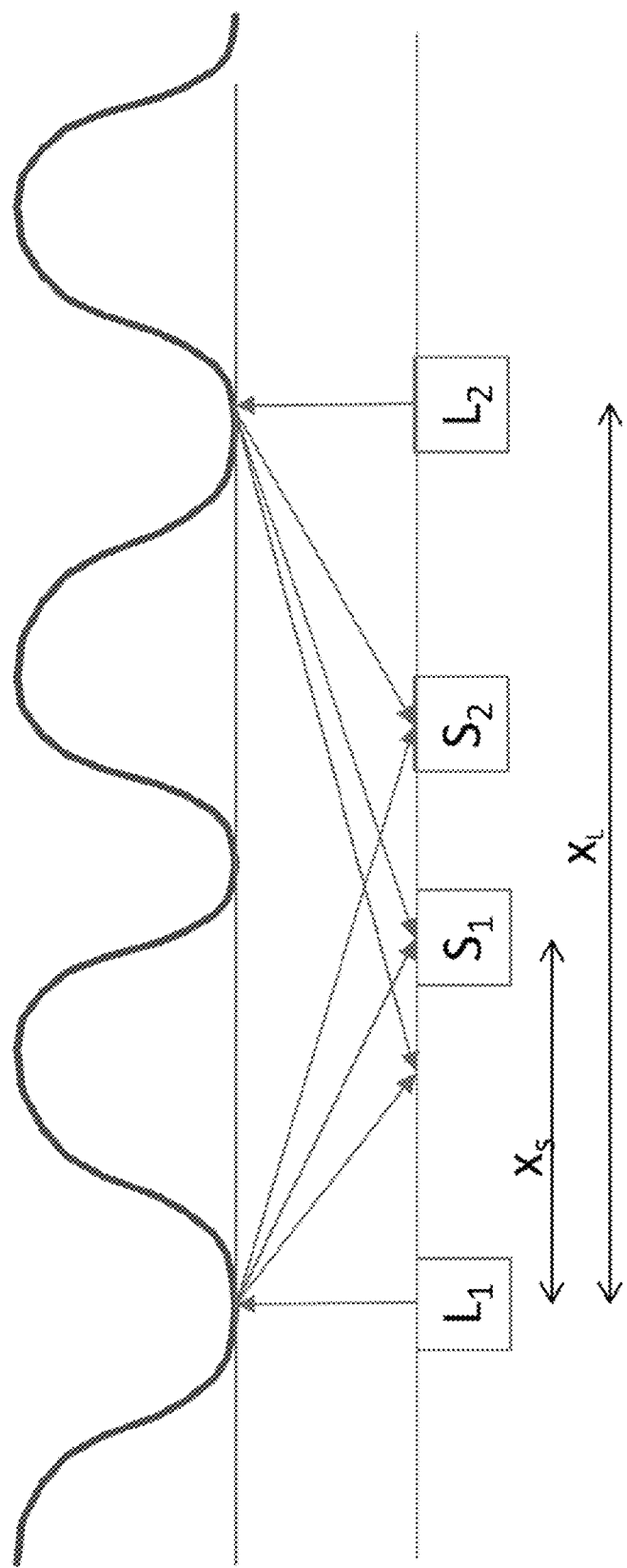
FIG. 2 illustrates a potential issue of interferences from two light sources according to aspects of the present disclosure.
Figure 3A:
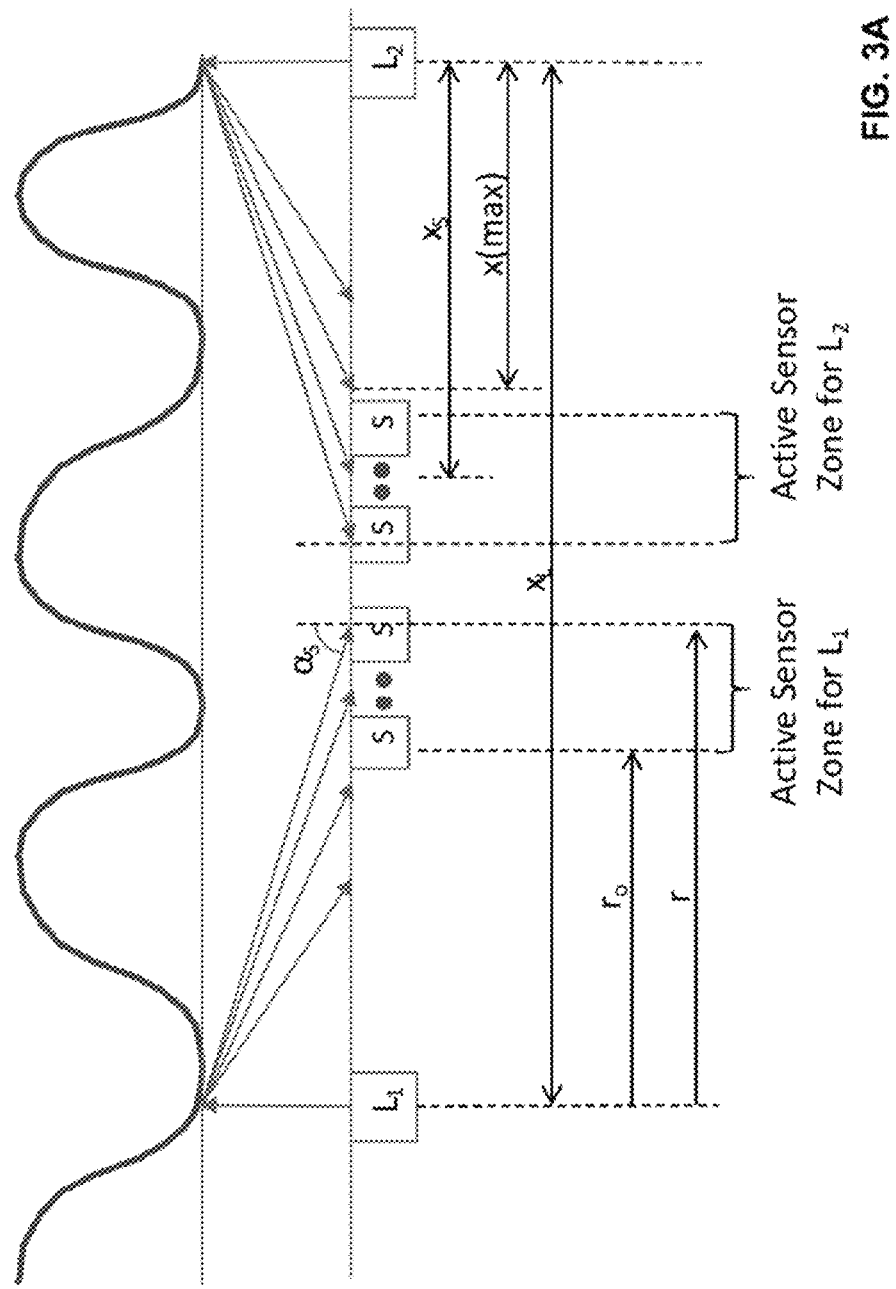
FIG. 3A illustrates an exemplary method of avoiding interferences from two light sources with respect to scattered light from ridges of a fingerprint according to aspects of the present disclosure.
Figure 3B:
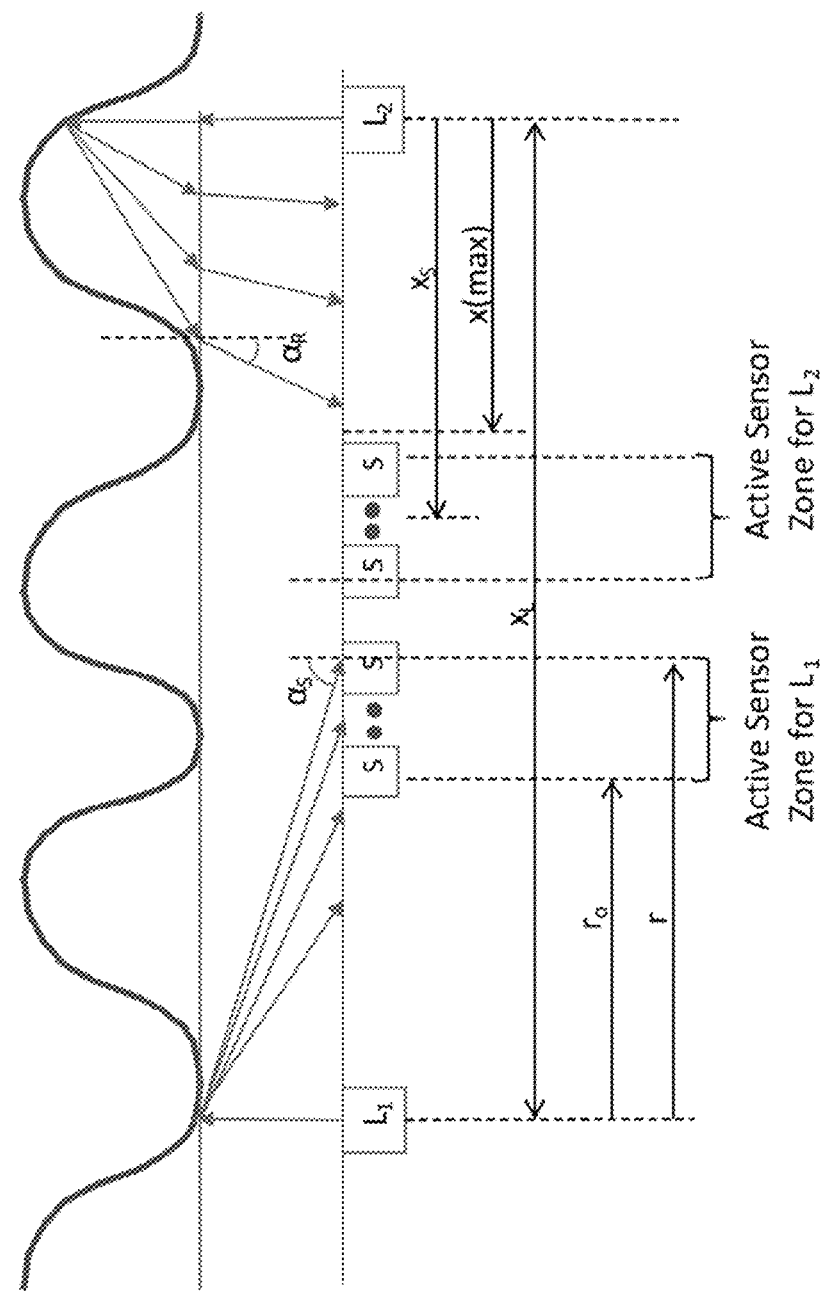
FIG. 3B illustrates an exemplary method of avoiding interferences from two light sources with respect to scattered light from a fingerprint according to aspects of the present disclosure.
Figure 4B:
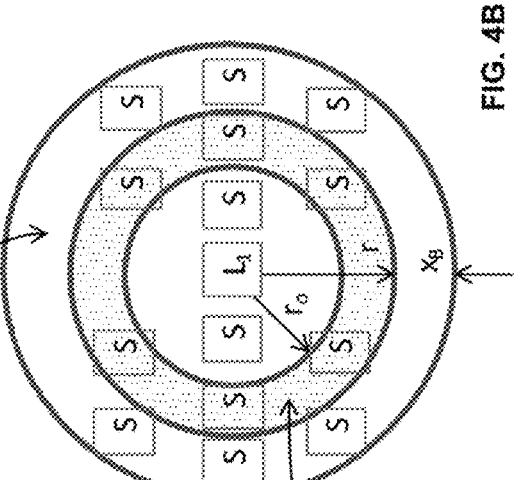
FIG. 4B illustrates a top view of the exemplary method of FIG. 3A according to aspects of the present disclosure.

In FIG. 2, light is projected simultaneously from two light sources, separated by a distance $x_L$, onto the imaging surface, each having an incident angle that is less than the critical angle at the light refractor/air interface. Light source L1 is located too close to light source L2 causing interference: one sensor receives light from rays scattered from two points of illumination, such as two ridges. To avoid the problems of imaging artifacts and low contrast caused by interference, $x_L$ can be large enough so that an active sensor does not receive overlapping light from rays scattered from two separate points of illumination as shown in FIG. 3A and FIG. 3B. In these figures, sensors located at a distance from L less than x(max) are ignored, not used, or turned off, and at least one sensor located at a distance from light source, between $r_0$ and r, where $r_0>x(max)$ and $r>r_0$, is an active sensor (FIG. 4A and FIG. 4B).

The value for r can be chosen as the distance where scattered light intensity hitting the emission plane decreases to a desired threshold value, such as <20%, <10%, <5%, 1%, or <1% of the scattered light intensity hitting the emission plane at $r_0$. Beyond the distance r, lower intensity scattered light could contribute to interference if $x_L(min)$ is not large enough. In such applications, a buffer zone may be added beyond the active sensor(s) to avoid interference at the active sensor(s). For some other applications, if such lower intensity light is negligible, then interference may be tolerated. For some other applications, r can be chosen as small as slightly larger than $r_0$. According to aspects of the present disclosure, $x_L(min)$ is referred to as the minimum distance between two light sources that can be simultaneously illuminated such that at least one active sensor will not receive interference from light reflected, refracted, or scattered from the point of illumination by the other light source.

According to aspects of the present disclosure, $x_L(min)$ can be estimated by using a number of models for attenuation of light intensity. In one approach, the minimum distance may be computed as $x_L(min)=2*width\ of\ ridge+a\ function(1/x_S^2)$. $x_S$ is the distance from a sensor to its corresponding light source L. If assuming a hemispherical model for attenuation, the intensity will decrease by $1/x_S^2$. $\alpha_S$ is the angle that a ray of scattered light received by sensor S makes with the normal to the light emission plane. If the angle of incidence to the normal of imaging surface, $\alpha_i$, is 0 degrees, then $x_S$=th*tan$(\alpha_s)$. The function determines how far $x_S$ can be where the intensity of light becomes negligible. To improve the contrast of the fingerprint image, the optical imaging apparatus can be configured so that light from two points of illumination do not overlap. To do so, $x_L(min)$ needs to be large enough but not too large as to make it impractical. $x_L(min)$ can be small enough that allow overlap of negligible light. A threshold can be determined for negligible light intensity.

Figure 3C:
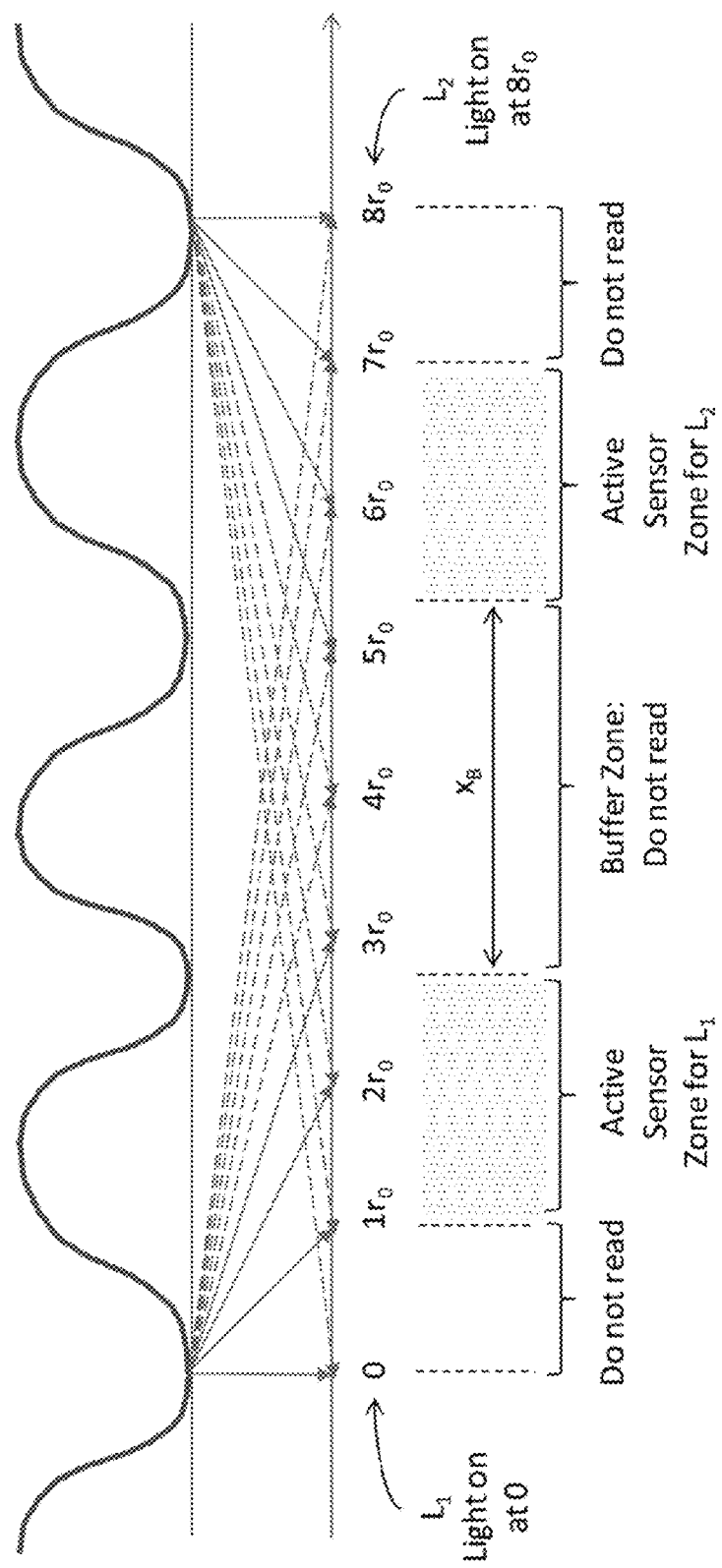
FIG. 3C illustrates another exemplary method of avoiding interferences from two light sources with respect to scattered light from a fingerprint according to aspects of the present disclosure.
Figure 5A:
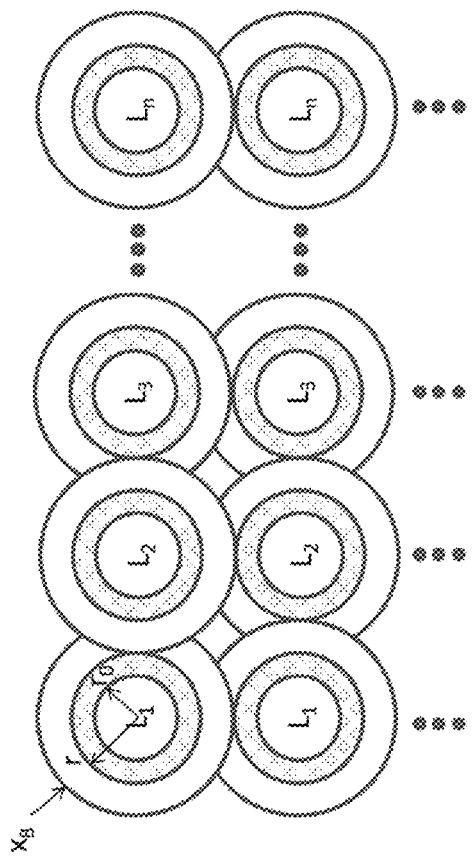
FIG. 5A illustrates an exemplary implementation of addressing a plurality of non-overlapping light sources and sensor zones according to aspects of the present disclosure.

In another approach, to avoid the worst case scenario of having interference from light scattered by two ridges, the minimum distance may be computed as $x_L(min)=2*r+x_B$. $x_B$ represents the width of a buffer zone, located between neighboring active sensor zones, in which scattered light is not sensed, the intensity of light becomes negligible, or scattered light from two points of illumination can overlap without causing interference that degrades the image. The threshold where the intensity of light becomes negligible can be determined for a particular design requirement. For example, the intensity may become negligible when it becomes <30%, <20%, <10%, <5%, 1%, or <1% of the intensity of light at $r_0$. To improve the contrast of the fingerprint image, the optical imaging apparatus can be configured so that light scattered from two points of illumination and collected in their respective active sensor zones do not overlap. To do so, $x_L(min)$ needs to be large enough but not too large as to make it impractical. $x_L(min)$ can be small enough to allow a tolerable overlap of negligible light for certain applications (such as shown in FIG. 5A). FIG. 3C illustrates another exemplary method of avoiding interferences from two light sources with respect to scattered light from a fingerprint according to aspects of the present disclosure. FIG. 3D illustrates a plot of light intensity overlap for the example of FIG. 3C according to aspects of the present disclosure.

An active sensor zone may include one light source and at least one active sensor that will not receive interference from a point of illumination from another light source. The active sensor zone can be a circular region surrounding one light source L circumscribed by a radius r. This zone includes at least one active sensor located inside of a circular ring having an inner radius of $r_0$>x(max) and an outer radius of r>$r_0$ (FIG. 4A and FIG. 4B).

To reduce the time needed to obtain a complete image of a fingerprint, multiple, non-overlapping active sensor zones can be activated simultaneously. The buffer zones may overlap if the interference due to the overlap can be tolerated by the given application. Examples of multiple active sensor zones are shown in arrays of different orientations in FIG. 5A and FIG. 5B. After one set of zones is illuminated and light information is collected, that set is deactivated, and another set of zones is activated in increments in space and time such as in a series of horizontal and vertical scans, or a combination of the two different scanning methods (FIG. 6A and FIG. 6B). This scanning process is repeated until the desired amount of information of the fingerprint is collected to assemble an image. The image quality and scanning/processing speed can be optimized by adjusting the arrangement of zones.

Figure 5B:
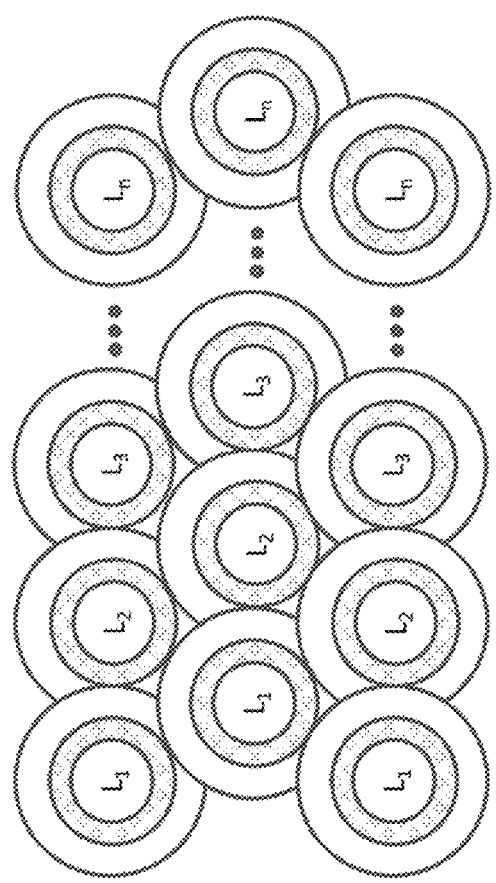
FIG. 5B illustrates another exemplary implementation of addressing a plurality of non-overlapping light sources and sensor zones according to aspects of the present disclosure.
Figure 6C:
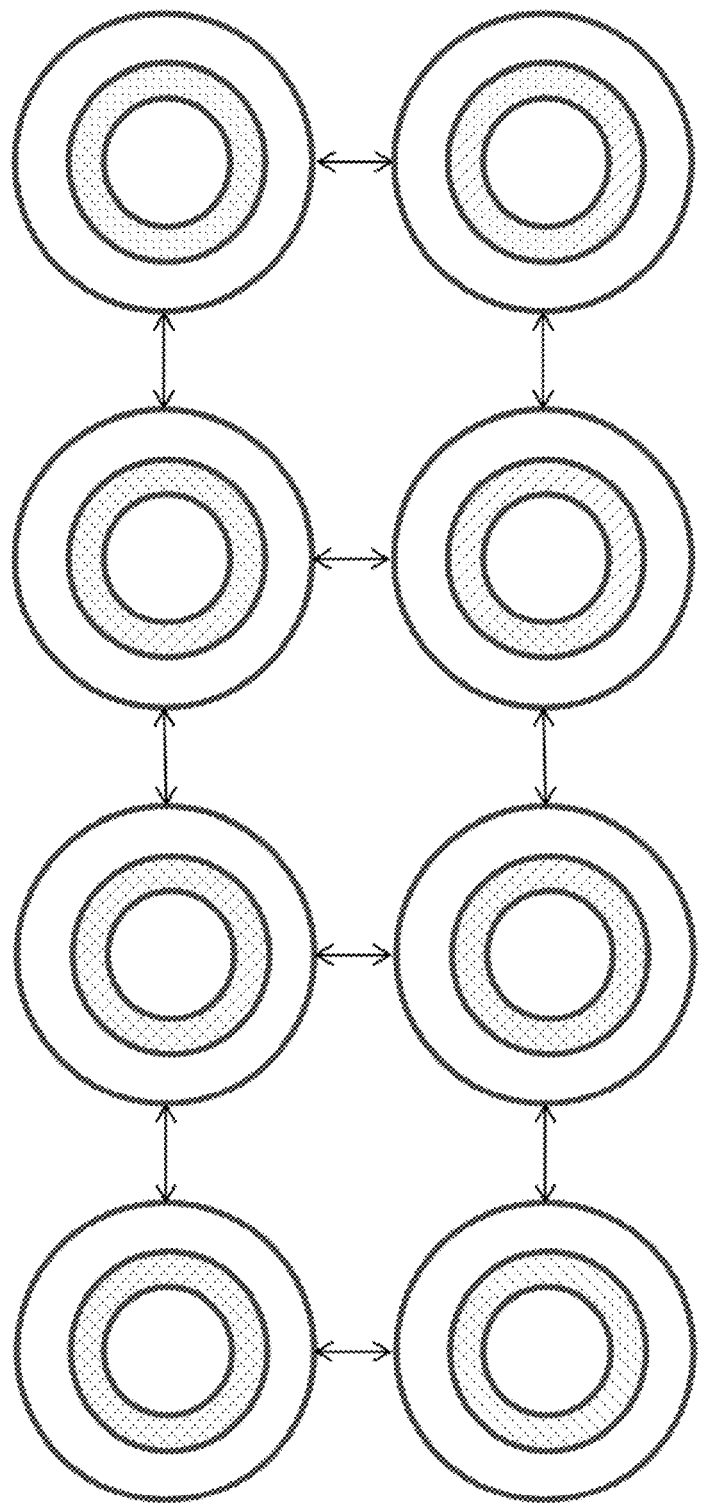
FIG. 6C illustrates exemplary separations between adjacent sensor zones for avoiding interferences according to aspects of the present disclosure.

The activated sensor zones such as in FIG. 5A can be arranged across the entire imaging area in rows, columns, or other conformations that allow for efficient addressing of the pixels and data collection. FIG. 5B shows an example of tighter packing of sensor zones for improved efficiency of fingerprint scanning. Space can be added between activated sensor zones such as in FIG. 6C to reduce leakage of stray light from one zone to another zone that may cause interference or introduce artifacts.

Figure 8B:
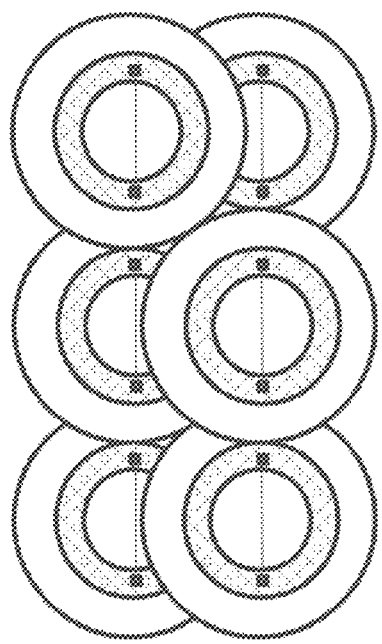
FIG. 8B illustrates another exemplary implementation of collecting sensor data according to aspects of the present disclosure.
Figure 8C:
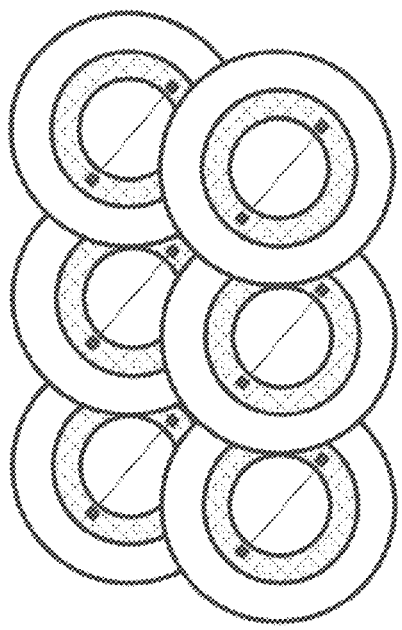
FIG. 8C illustrates yet another exemplary implementation of collecting sensor data according to aspects of the present disclosure.
Figure 8A:
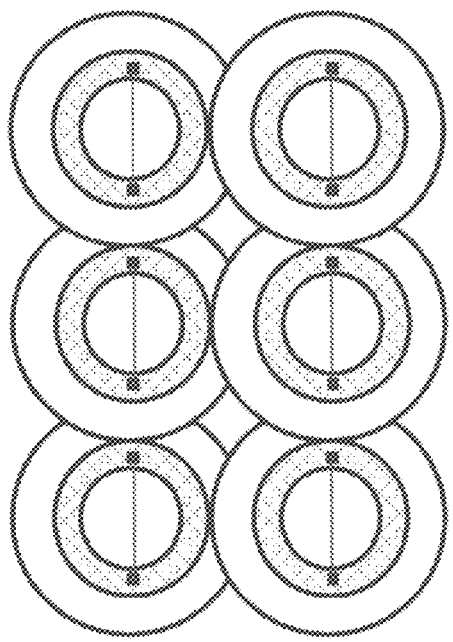
FIG. 8A illustrates an exemplary implementation of collecting sensor data according to aspects of the present disclosure.
Figure 8E:
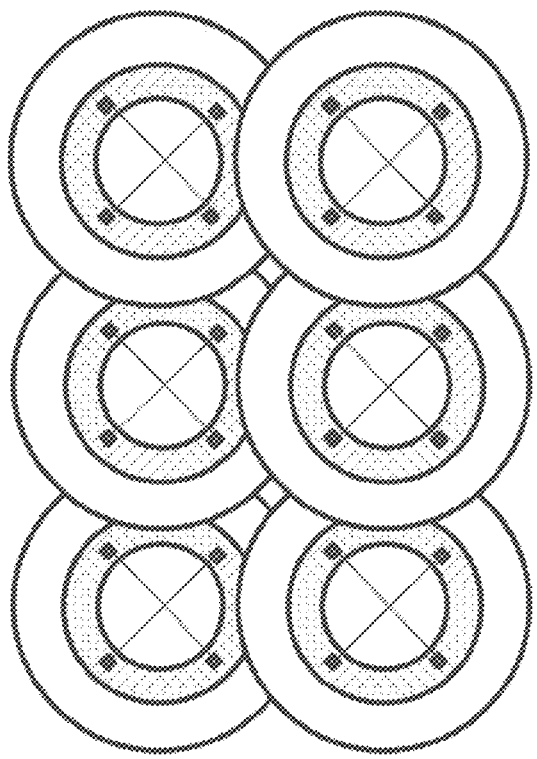
FIG. 8E illustrates yet another exemplary implementation of collecting sensor data according to aspects of the present disclosure.
Figure 8D:
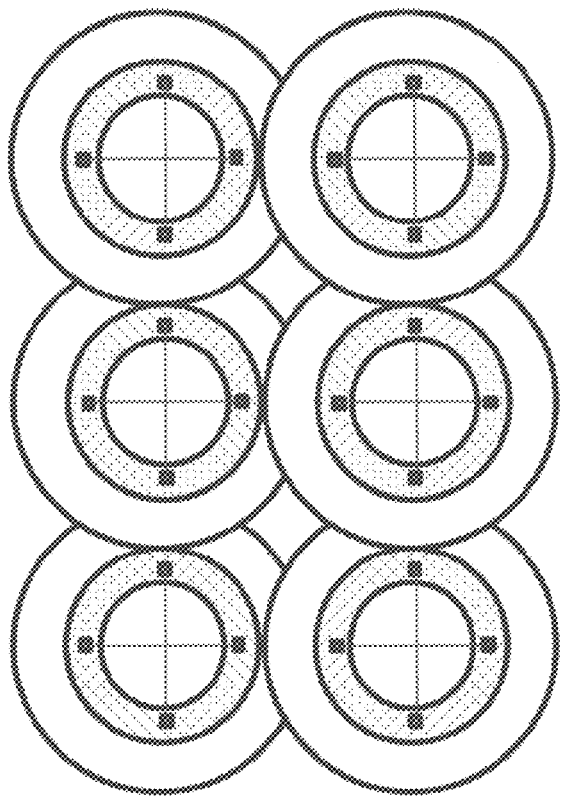
FIG. 8D illustrates yet another exemplary implementation of collecting sensor data according to aspects of the present disclosure.

To further reduce the data collection and processing time, the number of activated sensors within an active sensor zone may be reduced to form a line as in FIG. 8A or a cross such as in FIG. 8D. Removing sensors that are close to neighboring active sensor zones can also reduce possible interference from the neighboring zones. The line or cross shaped zones can be arranged into arrays such as in FIGS. 8B, 8C, and 8E that can help to further reduce the possibility of overlap and interference while allowing for tighter packing for improved efficiency of fingerprint scanning.

To decrease the active sensor zone size without compromising the high contrast and image clarity, the thickness of the optical structure can be reduced. This can reduce the active sensor zone radius, r, which allows for either a more compact array of zones which results in faster scanning or a larger gap between zones which produces a higher scanning quality.

Figure 9:
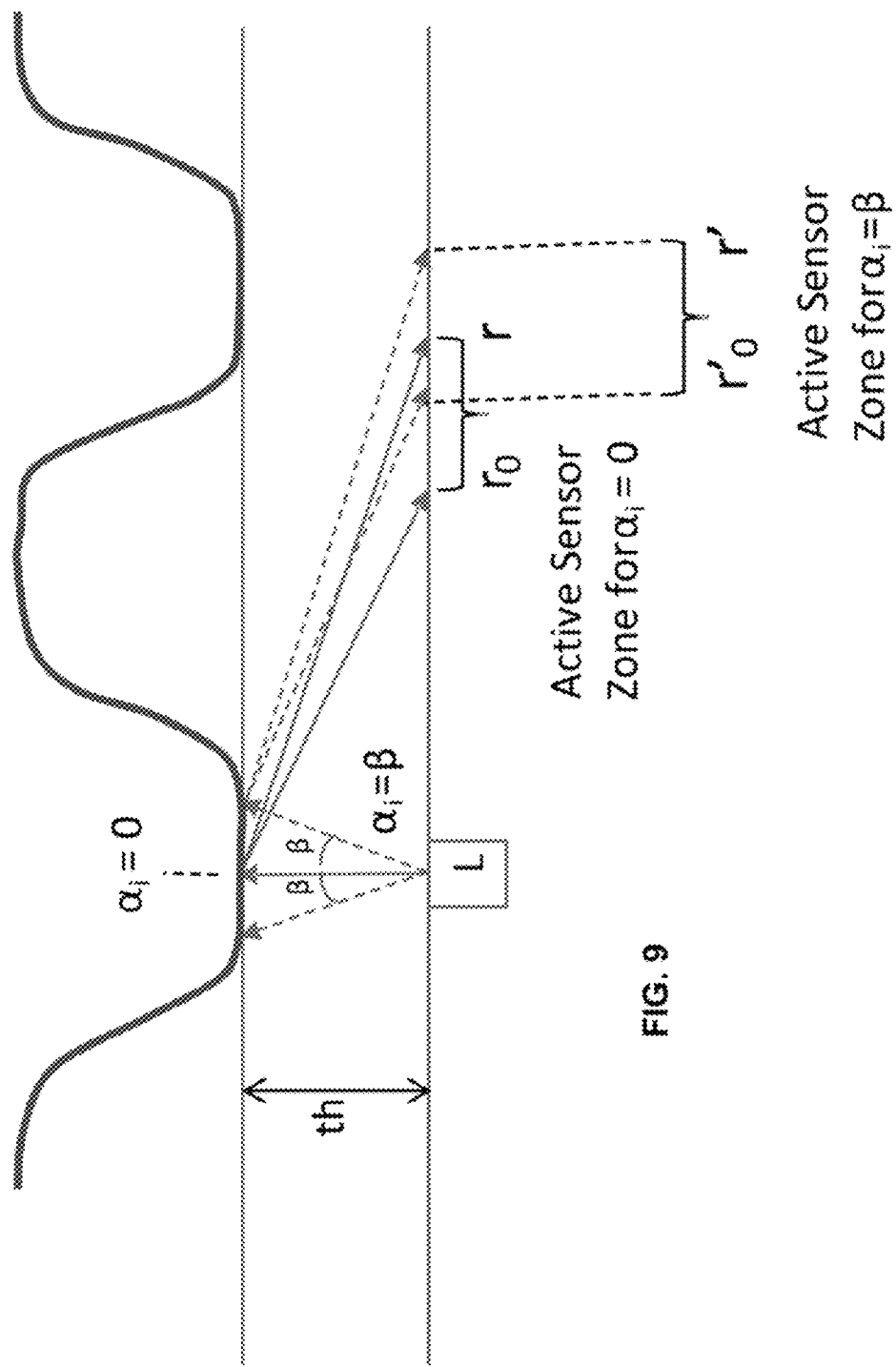
FIG. 9 illustrates effects of controlling a light emission cone on a corresponding active sensor zone according to aspects of the present disclosure.

In FIG. 9, the light emitted from a light source may leave the pixel at an emission angle ranging from zero to $\beta$ from the normal of the light emission plane. As shown in FIG. 9, a cone of light shown as $\beta$ can strike the imaging surface, effectively illuminating a circular area. The angle of incidence at the imaging surface, $\alpha_i$, would range from zero to $\beta$, creating a circular area of illumination. The light scattered by a ridge in this circular area would widen the radius of an active sensor zone from r to r' and possibly the x(max) so that $r_0'$>$r_0$. The active sensor zones can be spaced further apart to account for a non-zero value of beta. Overlapping reflected, refracted, or scattered light from different areas of a topographical feature may degrade the clarity of the fingerprint image. To reduce this degradation, the optical apparatus can be configured to reduce $\beta$ and reduce the thickness of the optical structure, either of which can help to reduce the area of illumination.

To maintain high contrast, $\beta$ may not be greater than the critical angle at the light refractor/air interface. If $\beta$ cannot be reduced, then the material of the light refractor can be selected to increase the critical angle. If the rings of active sensor zones are widened due to a non-zero $\beta$, then it would preferable to activate more sensors within each ring to increase sensitivity. Alternatively, when generating the fingerprint image, the light received by sensors closer to the inner-most ring near $r_0$ can be used, while the light received by the remaining sensors can be discarded or ignored. Using the methodologies described above, the image of a fingerprint can have a high contrast, which is important for accurate fingerprint recognition.

An add-on type of light refractor can be flexible, conformable, or transparent. One example of such an add-on light refractor can be a TFT panel structure including light sensing components on the bottom of the panel, beneath a substrate. The substrate can be, for example, glass, plastic, or polymer. Together with the substrate, the TFT panel structure may be configured to function as a light sensing panel.

Figure 15:
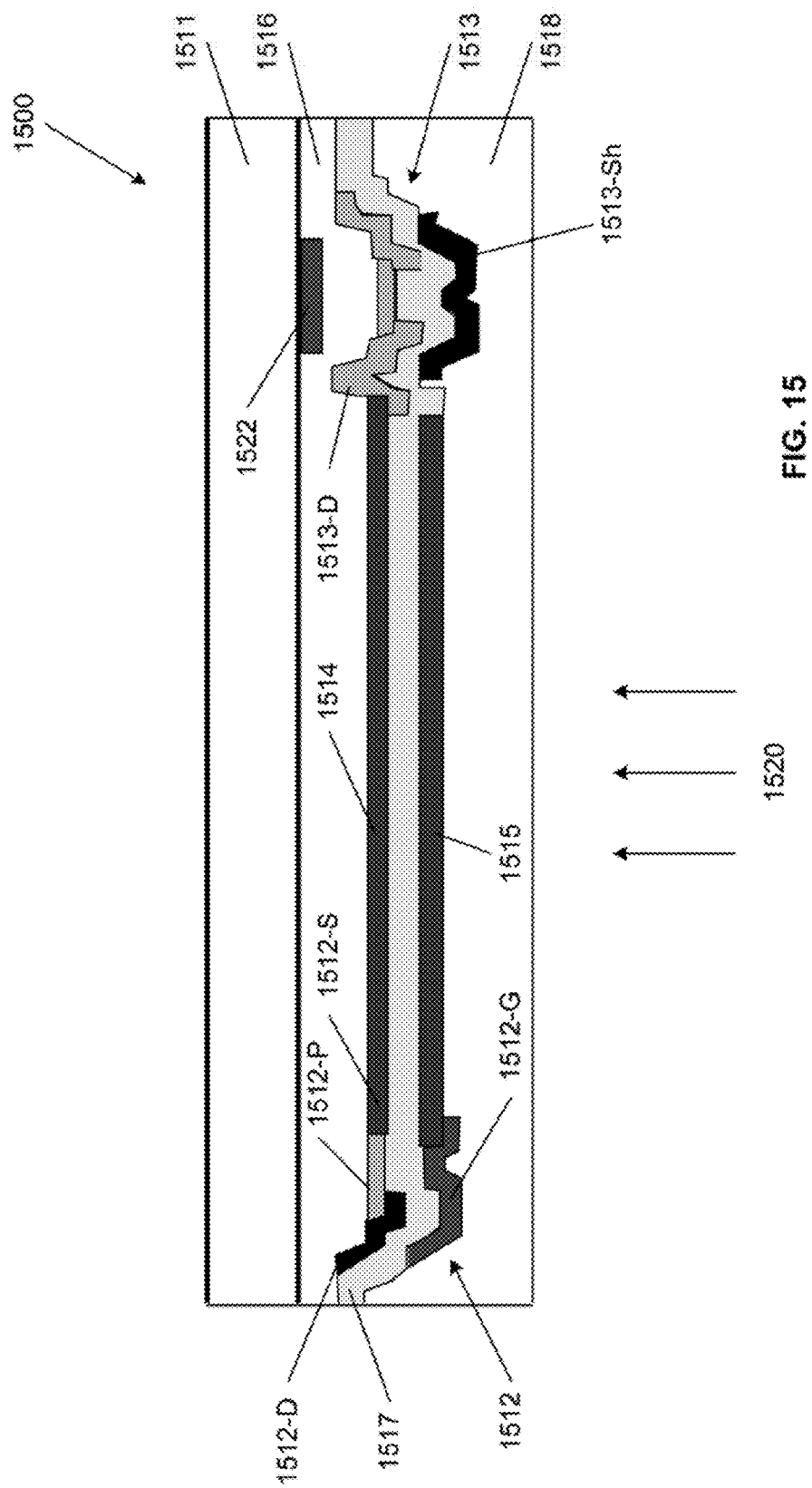
FIG. 15 illustrates an exemplary light sensing panel using a thin film transistor (TFT) panel structure according to aspects of the present disclosure.

FIG. 15 illustrates an exemplary light sensing panel using a thin film transistor (TFT) panel structure according to aspects of the present disclosure. Each cell of the TFT panel structure can be an addressable light sensing component, referred to as a sensing pixel. In the example shown in FIG. 15, capture sensor 1500 includes a passivation layer 1518, which can be formed of SiNx. On top of passivation layer 1518, a storage capacitor layer is formed including first electrode 1515. This storage capacitor layer is preferably formed from indium tin oxide (ITO), which is conductive and transparent. On top of first electrode 1515, an insulating layer 1517 is formed, preferably of SiNx. Over insulating layer 1517, a second electrode 1514 is formed, preferably of tin oxide. First electrode 1515, insulating layer 1517 and second electrode 1514 together form the storage capacitor. Over second electrode 1514, another insulating layer 1516 is formed, which can be formed from SiNx. A layer of glass layer 1511 is placed over insulating layer 1516. A fingerprint to be imaged is placed on glass layer 1511, which may be referred to herein as the imaging surface.

A light sensing unit 1512, which is preferably a thin-film transistor, and a switching unit 1513, which is also preferably a thin-film transistor, are horizontally arranged on a passivation layer 1518. Under passivation layer 1518, a back light 1520 irradiates light upward to be passed through the fingerprint capture sensor 1500. As shown in FIG. 15, back light 1520 can be separated from a lower, exposed surface of passivation layer 1518. It is also considered, however, that backlight 1520 be placed against lower surface of passivation layer 1518. Backlight 1520 can be an LED or any other type of light source. A source electrode 1512-S of the light sensing unit 1512 and a drain electrode 1513-D of the switching unit 1513 are electrically connected through second electrode 1514. A gate electrode 1512-G of the light sensing unit 1512 is connected to first electrode 1515. Additionally, a first light shielding layer 1513-*sh* is placed between insulating layer 1517 and passivation layer 1518 at switching unit 1513. As detailed below, first light shielding layer 1513-*sh* blocks light from backlight 1520 from reaching switching unit 1513. Additionally, second light shielding layer 1522 is positioned between glass layer 1511 and insulating layer 1516 at switching unit 1513 to shield switching unit 1513 from light passing through or reflected from glass layer 1511.

In the above structure, a photosensitive layer 1512-P such as amorphous silicon (a-Si:H) is formed between the drain electrode 1512-D and source electrode 1512-S of the light sensing unit 1512. Note that photosensitive layer 1512-P allows current to flow in response to a predetermined amount of light striking a surface of photosensitive layer 1512-P. In this way, when more than a predetermined quantity of light is received at a surface of photosensitive layer 1512-P, current flows through the drain electrode 1512-D and the source electrode 1512-S.

According to aspects of the present disclosure, in a method of fabricating capture sensor 1500, a second light shielding layer 1522 is first placed on glass layer 1511 via evaporation, sputtering or any other method. Glass layer 1511 is preferably between about 5 and 10 um, though may be either thicker or thinner. Light shielding layer 1522 is preferably formed from a metal such as aluminum, but may be formed from any suitable light blocking material. Next, insulating layer 1516 is formed on top of glass layer 1511 and second light shielding layer 1522. As noted above, insulating layer 1516 is preferably formed from SiNx. Photosensitive layer 1512-P is then formed over insulating layer 116. As discussed above, photosensitive layer 1512-P is preferably formed from a-Si:H. Source electrode 1512-D of light sensing unit 1512, second electrode 1514 and drain electrode 1513-D of switching unit 1513 are next formed over insulating layer 1516. Source electrode 1512-D, second electrode 1514 and drain electrode 1513-D are each preferably formed of ITO, but may be formed of any suitable conductor. Next, insulating layer 1517 is formed and over insulating layer 1517 first electrode 1515 is formed. Insulating layer 1517 is preferably formed from SiNx and first electrode 1515 is preferably formed of ITO but may be formed of any suitable conductor. Next, gate electrode 1512-G of light sensing unit 1512 and light shield 113-*sh* are formed. Preferably, gate electrode 1512-G and light shielding layer 1513-*sh* are each formed of ITO, but may be formed of any suitable material and light shielding layer 1513-*sh* does not need to be formed from the same material as gate electrode 1512-G. Next, passivation layer 1518, which is preferably formed from SiNx, is formed over first electrode 1515, gate electrode 1512-G and light shielding layer 1513-*sh*. As discussed above, backlight 1520 can either be attached to the lower, exposed surface of passivation layer 1518 or separately supported.

In another implementation, an image capture sensor can have substantially the same structure as capture sensor shown in FIG. 15 except that conductive ITO layer is placed beneath glass layer and an insulating layer, which can be formed of SiNx, is placed below ITO layer. Because ITO layer is conductive, electrostatic charge built up on glass layer can be discharged by connecting ITO layer to a ground. This can prevent damage to capture sensor. Image capture sensor can be fabricated in substantially the same manner as image capture sensor except that ITO layer is formed over glass layer and insulating layer is formed over ITO layer prior to forming light shielding layer over insulating layer.

In yet another implementation, an image capture sensor can have substantially the same structure as capture sensor shown in FIG. 15. Specifically, the capture sensor includes a light sensing unit, which is substantially the same and light sensing unit, and switching unit, which is substantially the same as switching unit, formed between an insulating layer and a passivation layer. However, above insulating layer capture sensor includes a substrate layer having a plurality of fiber-optic strands running in a direction perpendicular to a surface of substrate layer. Preferably, the diameter of the fiber-optic strands 330*a* forming substrate layer is from about 4 um to about 8 um in diameter and more preferably about 6 um in diameter, though larger or smaller diameters can also be used. Substrate layer can be formed from glass fiber optic strands 330*a* or fiber optic strands of other substantially transparent materials including polymers. Fiber optic sheets can be used to form the substrate layer.

Figure 16:
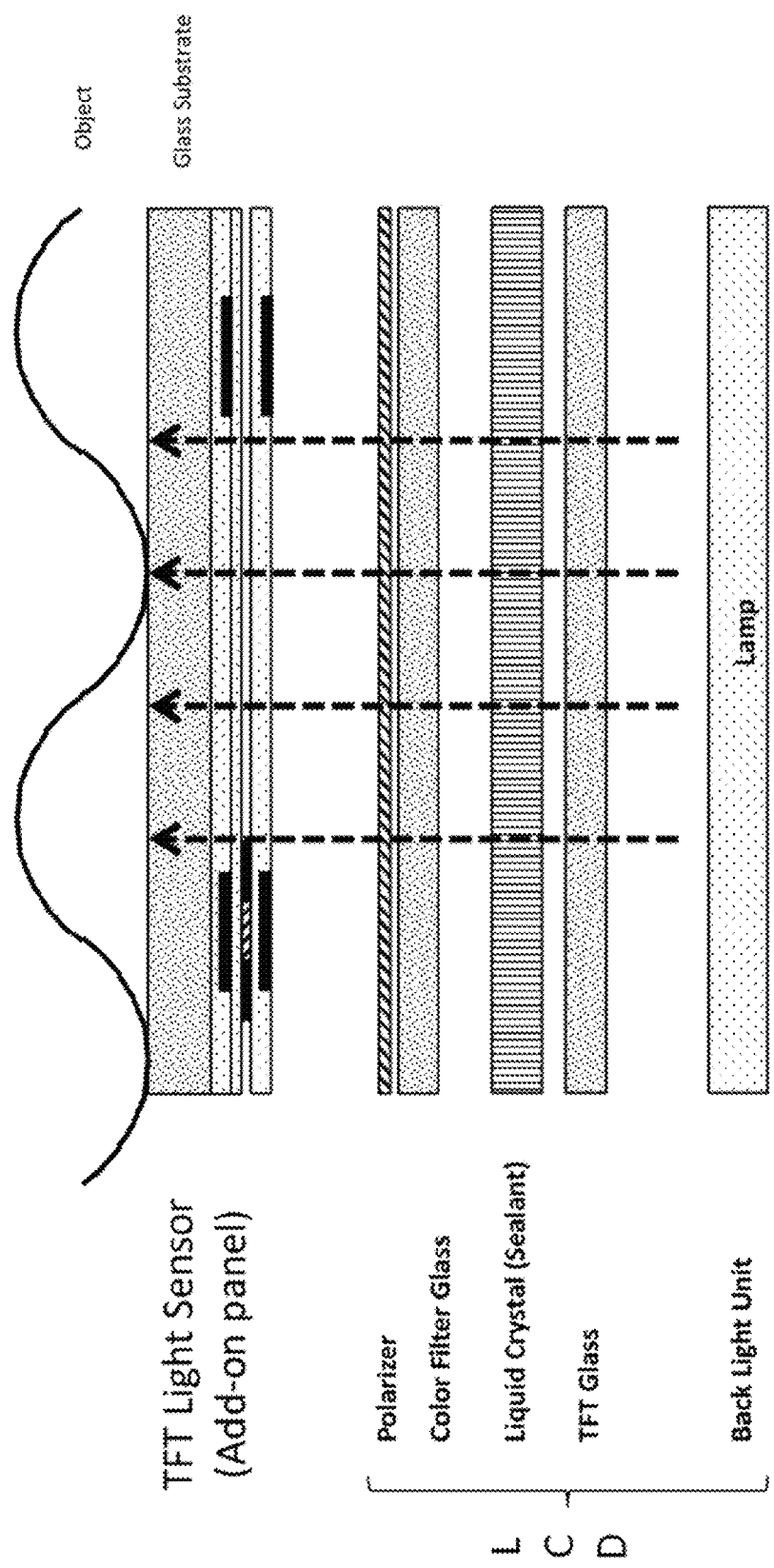
FIG. 16 illustrates an exemplary fingerprint detection system according to aspects of the present disclosure.

A light sensor panel can be implemented as an add-on panel that is placed on top of a light source panel. The light source panel can be, for example, an LCD panel or an AMOLED panel. FIG. 16 illustrates an exemplary fingerprint detection system, in which a TFT type light sensor panel is placed on top of an LCD display panel structure as an add-on panel. In this example, a TFT type light sensor panel is placed on top of an LCD panel structure as an add-on panel. The sensing pixels of the TFT type light sensing panel can be individually addressable and can be activated according to a designated sensor zone pattern.

Figure 17:
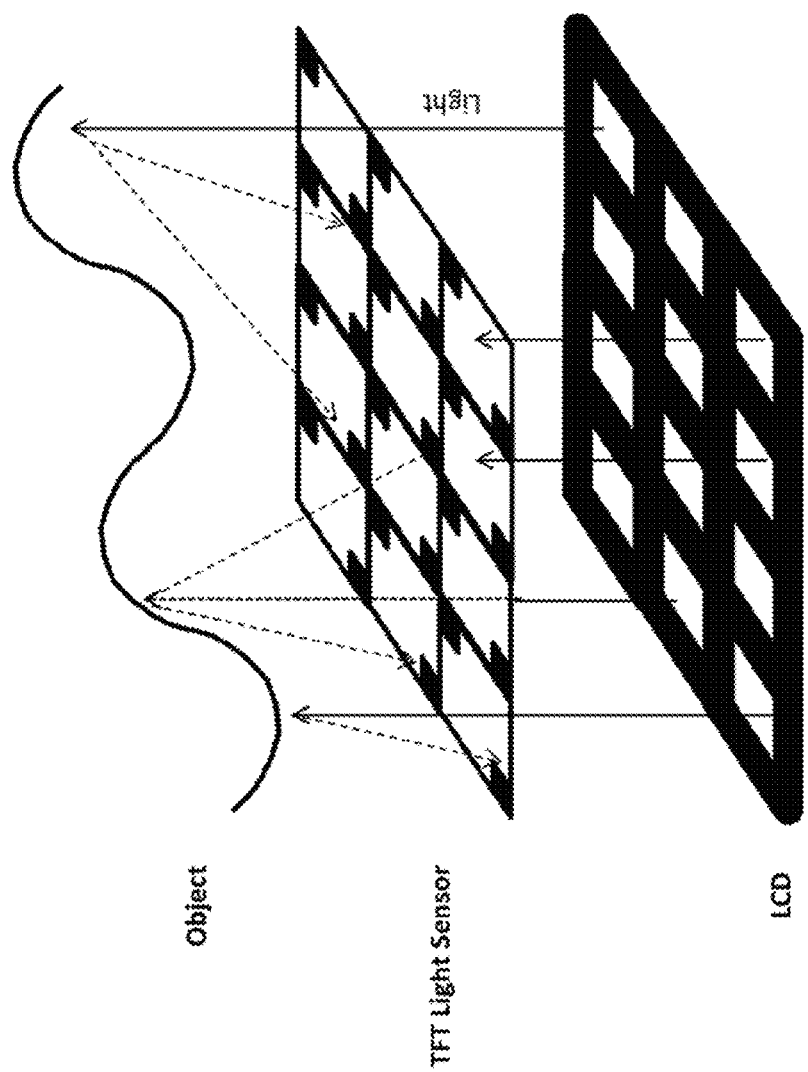
FIG. 17 illustrates an exemplary panel structure according to aspects of the present disclosure.

If there are non-transparent areas in the light sensor panel, these areas can be aligned with the non-transparent areas of the light source panel. FIG. 17 illustrates an exemplary TFT light sensor panel aligned with an LCD panel structure, wherein non-transparent components of the TFT light sensor panel are aligned with the black matrix areas of the LCD display panel structure. In this example, the TFT light sensor panel is aligned with the LCD panel structure. The non-transparent components on the TFT light sensor panel are aligned with the black matrix area on the LCD display panel structure.

The black matrix areas of the LCD display panel are non-transparent and therefore would block the transmission of the display backlight. The light sensor panel can be designed so that its non-transparent areas can be aligned with the black matrix areas of the LCD panel. When the LCD display emits light through the transparent areas of the LCD display, this light can be used as the light source for the light sensor panel. The LCD display can individually control cells (individually addressable) to emit light as discrete light sources that are projected into the light refractor according to a designated illumination pattern.

As described above, the light refracting device can, for example, also be a thin-film transistor (TFT) add-on panel placed on top of an LCD or AMOLED display panel structure that acts as a panel of light sources. Incident light from the light source panel is projected through the light receiving surface and projected directly or indirectly onto the imaging surface to create an image of the patterned object from the projected light onto the viewing plane. This fingerprint sensing apparatus can be also used as a touch sensor when implemented in a mobile device.

Figure 10A:
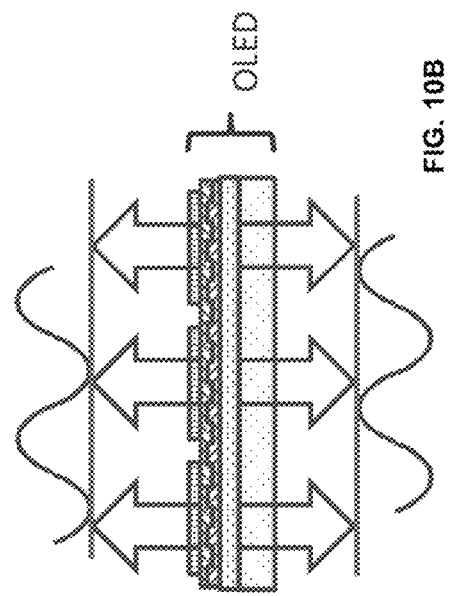
FIG. 10A illustrates a unidirectional OLED with fingerprint sensors according to aspects of the present disclosure.
Figure 10B:
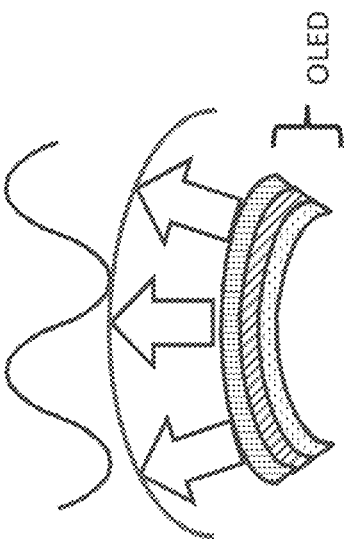
FIG. 10B illustrates a bi-directional OLED with fingerprint sensors according to aspects of the present disclosure.
Figure 10C:
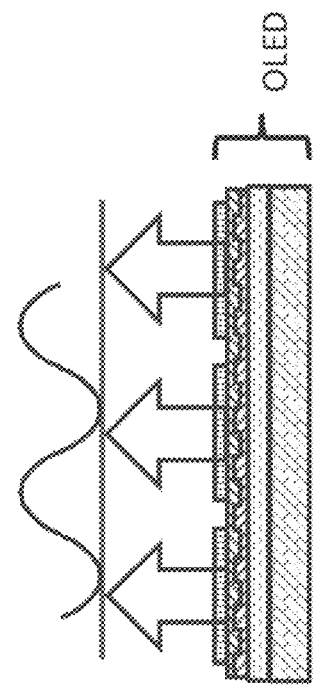
FIG. 10C illustrates a conformable OLED with fingerprint sensors according to aspects of the present disclosure.

According to aspects of the present disclosure, both top emission and bottom emission type OLED structures (FIG. 10A) can be used as the main component of a fingerprint acquisition apparatus. Several different types of OLED devices, such as small molecule OLED, polymer OLED, or solution based OLED, may be utilized as main OLED device structures. Both transparent and non-transparent OLED panels can be used as the main component of a fingerprint acquisition apparatus. (FIG. 10B) Both thin panel and flexible or conformable types of OLED panels can be used as the main component of a fingerprint acquisition apparatus. (FIG. 10C)

An active matrix OLED (AMOLED) panel can be used as the main component of a fingerprint acquisition apparatus. An AMOLED panel may include subpixel areas (red, green, and blue subpixels) and a driving circuit area (thin film transistor and capacitor). The brightness of each subpixel can be adjusted by the driving and switching transistors and capacitors and by controlling the amount of current injected to the OLED subpixels. The dimension of subpixels can be formed using OLED material deposition techniques. For instance, the size and position of subpixels can be set by using shadow masks during the OLED material evaporation process.

Figure 10D:
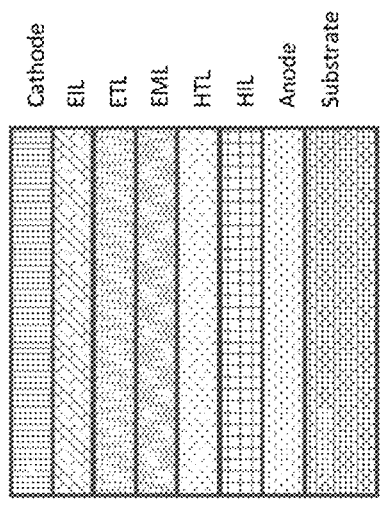
FIG. 10D illustrates an exemplary OLED structure according to aspects of the present disclosure.

An OLED may have a layered structure with the following sequence: anode/hole injection layer/hole transport layer/emissive layer/electron transport layer/electron injection layer/cathode. ITO and other transparent conducting materials having high work function can be used for anode materials, and metals such as aluminum and magnesium can be used for cathode materials. FIG. 10D shows the structure of a bottom emission OLED. In this example, the imaging surface would be at the bottom of the substrate, and the light emission plane would be the cathode layer. The optical structure may include the transparent layers between the substrate and the cathode.

The reliability of such a fingerprint acquisition apparatus, i.e. the OLED panel lifetime, can be improved by using various sealing techniques and materials, such as desiccant, frit glass sealing, and thin film encapsulation. Various types of substrates such as sapphire, glass, and plastic materials can be used for OLED carriers in order to control the light travel path (refractive index control), to enhance/improve signal to noise ratio of image sensing, and to improve the reliability and lifetime of fingerprint apparatus. FIG. 11A shows an exemplary AMOLED subpixel unit cell circuit (2D-driving TFT circuit with subpixels). The driving area may include a driving transistor, switching transistor, holding capacitor, and reverse current sensor. FIG. 11B shows the reverse current read and amplified in the OLED circuit structure.

Figure 12:
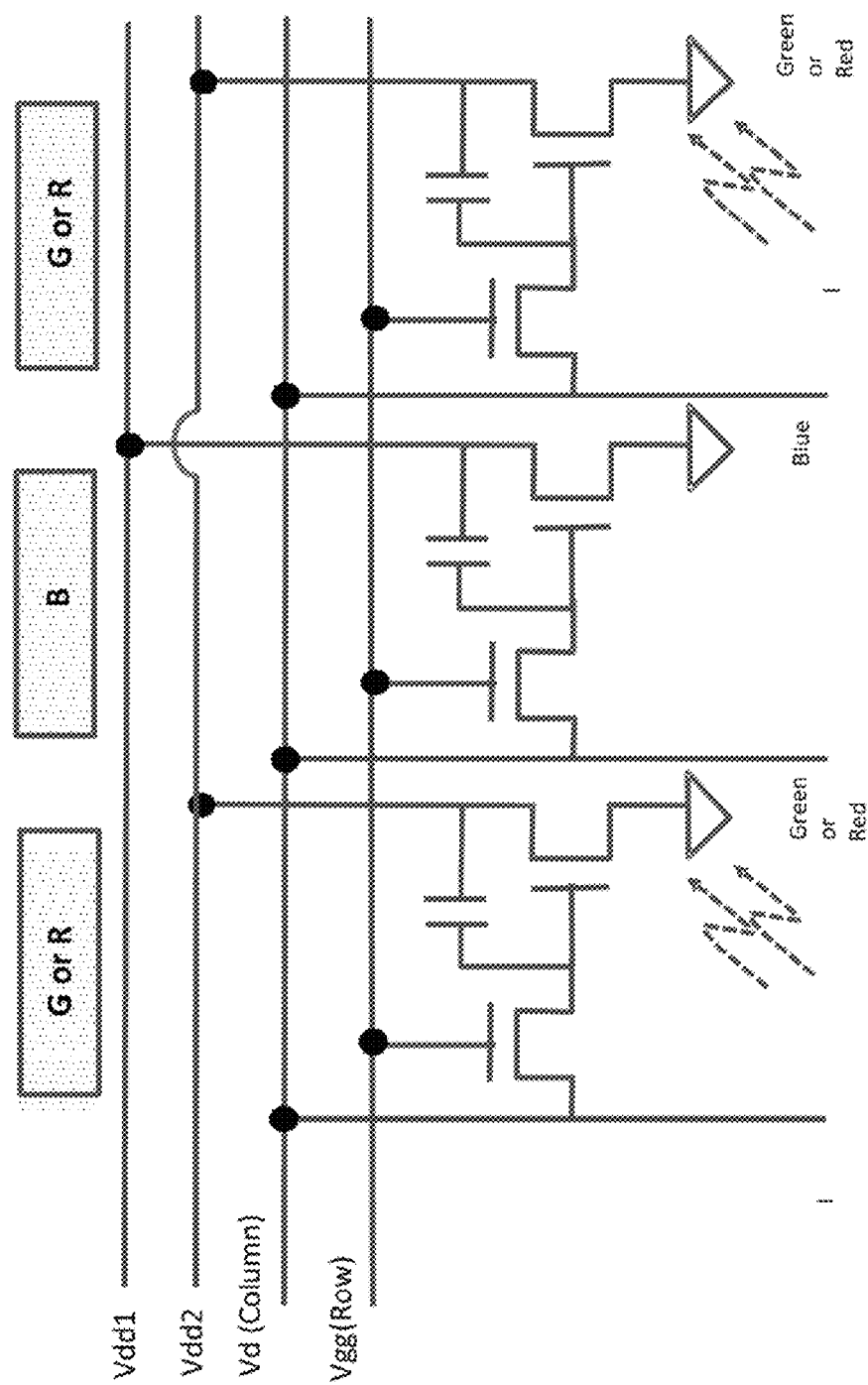
FIG. 12 illustrates an exemplary pixel circuit cell with RGB subpixels according to aspects of the present disclosure.
Figure 13:
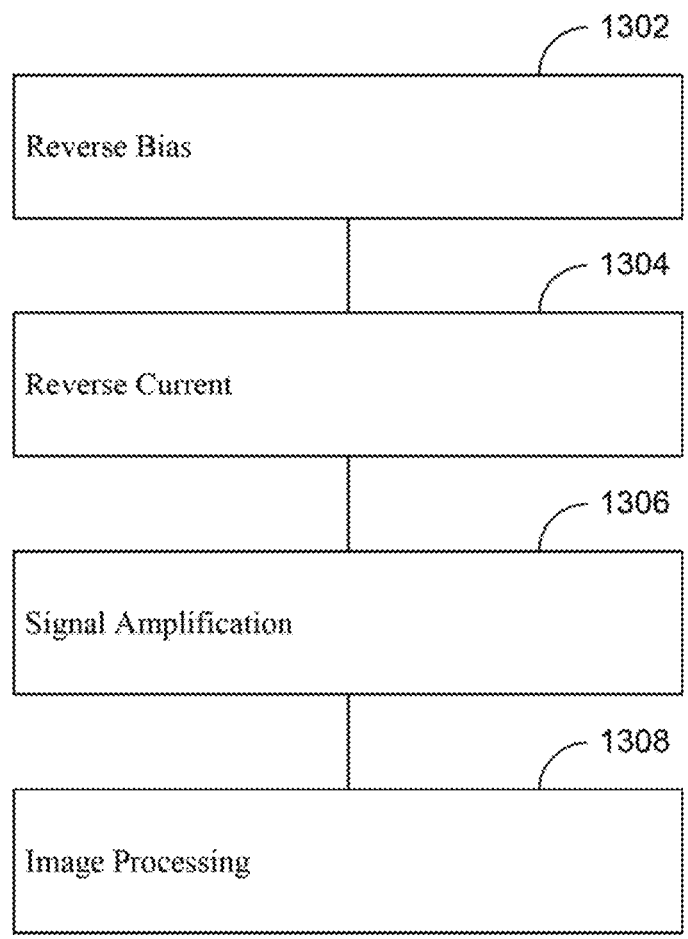
FIG. 13 illustrates a process of fingerprint acquisition using AMOLED according to aspects of the present disclosure.
Figure 14:
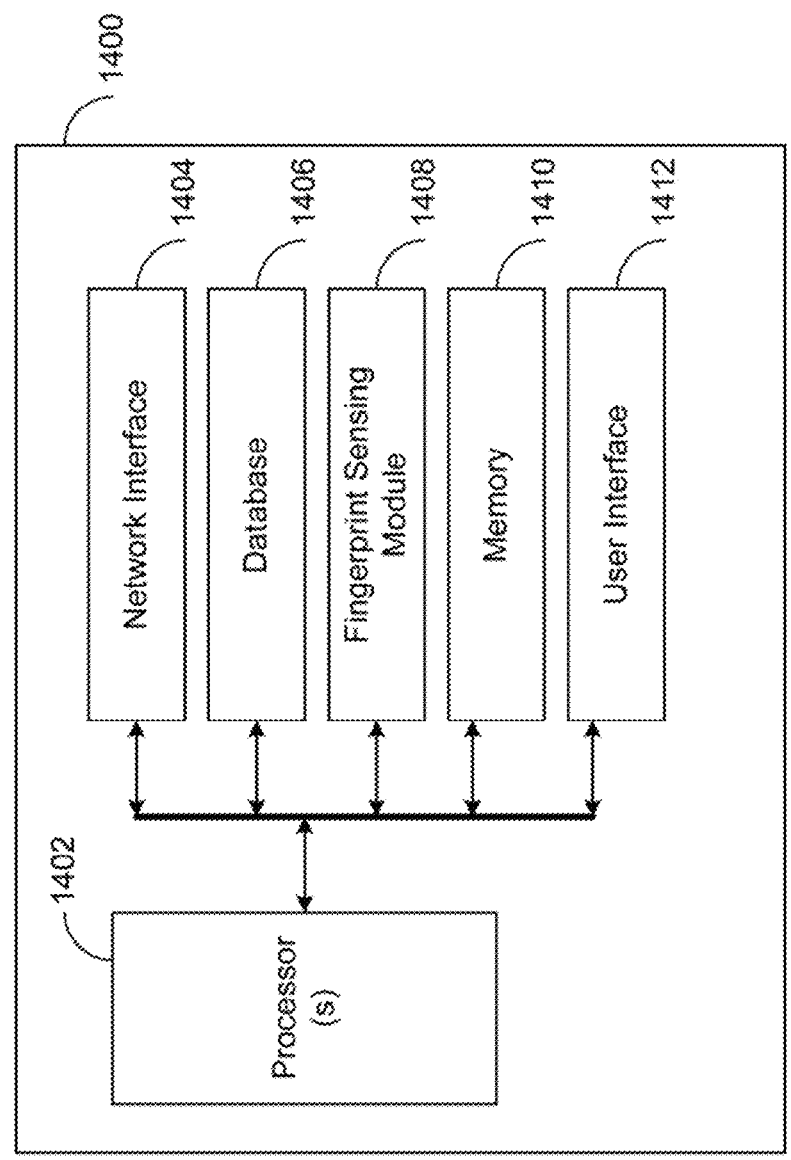
FIG. 14 illustrates an exemplary controller of a thin high contrast optical acquisition system for fingerprint recognition according to aspects of the present disclosure.

In some embodiments, an AMOLED panel has a three-subpixel structure. In the subpixel structure, for example, a blue subpixel can be used as a light source while the neighboring green or red subpixels may be used as a sensor because the band gap of blue subpixels is larger than that of the green or red subpixels. FIG. 12 shows an exemplary R/G/B pixel structure where the blue subpixel is the light source, and the green or red subpixel is the sensor. The reverse voltage can be biased in the sensor subpixel when the lighting subpixel is turned on. In FIG. 11B, the I-V curves correspond with subpixel structures in FIG. 12. The amount of reverse current in the sensor subpixel under reverse bias is increased when light is reflected, refracted, or scattered from a fingerprint to the sensor subpixel. The amount of reverse current can be measured using current sensing circuits in the driving circuit area. The reverse current signal can be amplified using an amplification circuit, and/or a signal processor. The amplified current signal can then be processed to generate a fingerprint image by a signal processing algorithm (FIG. 13, algorithm flow chart).

The OLED panel resolution can be controlled by varying the size and density of each subpixel and by setting the subpixel structure of the OLED panel. For example, an OLED panel may have a larger lighting component (e.g. blue subpixels) and a smaller sensor component (e.g. green and/or red subpixels). According to aspects of the present disclosure, subpixel structures can have different sizes. The subpixel density can be enhanced by changing pixel shape from stripe type to circular or diamond shape. In addition, an OLED subpixel structure can have different shapes, such as square, rectangle, circle, diamond, etc. The patterning of the subpixel structure can be fabricated by using fine metal mask processes, ink-jet printing, or laser transfer technologies.

According to aspects of the present disclosure, a mobile device is usually equipped with a touch sensor. If a mobile device was equipped with the fingerprint sensing apparatus of the present disclosure, then the touch sensor would not be required, as the fingerprint sensing apparatus may also be used as a touch sensor. As described herein, a mobile device can be configured to include a thin high contrast optical acquisition system as a fingerprint sensing apparatus for fingerprint recognition. In some implementations, the mobile device may comprise a wireless transceiver which is capable of transmitting and receiving wireless signals via wireless antenna over a wireless communication network. Wireless transceiver may be connected to a bus by a wireless transceiver bus interface. The wireless transceiver bus interface may, in some embodiments be at least partially integrated with wireless transceiver. Some embodiments may include multiple wireless transceivers and wireless antennas to enable transmitting and/or receiving signals according to a corresponding multiple wireless communication standards such as, for example, versions of IEEE Std. 802.11, CDMA, WCDMA, LTE, UMTS, GSM, AMPS, Zigbee and Bluetooth®, etc.

The mobile device may also comprise a SPS receiver capable of receiving and acquiring SPS signals via a SPS antenna. The SPS receiver may also process, in whole or in part, acquired SPS signals for estimating a location of the mobile device. In some embodiments, processor(s), memory, DSP(s) and/or specialized processors (not shown) may also be utilized to process acquired SPS signals, in whole or in part, and/or calculate an estimated location of the mobile device, in conjunction with the SPS receiver. Storage of SPS or other signals for use in performing positioning operations may be performed in memory or registers (not shown).

In addition, the mobile device may comprise digital signal processor(s) (DSP(s)) connected to the bus by a bus interface, processor(s) connected to the bus by a bus interface and memory. The bus interface may be integrated with the DSP(s), processor(s) and memory. In various embodiments, functions may be performed in response execution of one or more machine-readable instructions stored in memory such as on a computer-readable storage medium, such as RAM, ROM, FLASH, or disc drive, just to name a few example. The one or more instructions may be executable by processor(s), specialized processors, or DSP(s). The memory may comprise a non-transitory processor-readable memory and/or a computer-readable memory that stores software code (programming code, instructions, etc.) that are executable by processor(s) and/or DSP(s) to perform functions described herein. In a particular implementation, the wireless transceiver may communicate with processor(s) and/or DSP(s) through the bus to enable the mobile device to be configured as a wireless station as discussed above. Processor(s) and/or DSP(s) may execute instructions to execute one or more aspects of processes/methods discussed above in connection with FIG. 1 to FIG. 6A-6C and FIG. 8A-8E to FIG. 17.

According to aspects of the present disclosure, a user interface may comprise any one of several devices such as, for example, a speaker, microphone, display device, vibration device, keyboard, touch screen, etc. In a particular implementation, the user interface may enable a user to interact with one or more applications hosted on the mobile device. For example, devices of user interface may store analog or digital signals on the memory to be further processed by DSP(s) or processor in response to action from a user. Similarly, applications hosted on the mobile device may store analog or digital signals on the memory to present an output signal to a user. In another implementation, the mobile device may optionally include a dedicated audio input/output (I/O) device comprising, for example, a dedicated speaker, microphone, digital to analog circuitry, analog to digital circuitry, amplifiers and/or gain control. In another implementation, the mobile device may comprise touch sensors responsive to touching or pressure on a keyboard or touch screen device.

The mobile device may also comprise a dedicated camera device for capturing still or moving imagery. The dedicated camera device may comprise, for example an imaging sensor (e.g., charge coupled device or CMOS imager), lens, analog to digital circuitry, frame buffers, etc. In one implementation, additional processing, conditioning, encoding or compression of signals representing captured images may be performed at the processor(s) or DSP(s). Alternatively, a dedicated video processor may perform conditioning, encoding, compression or manipulation of signals representing captured images. Additionally, the dedicated video processor may decode/decompress stored image data for presentation on a display device on the mobile device.

The mobile device may also comprise sensors coupled to the bus which may include, for example, inertial sensors and environment sensors. Inertial sensors may comprise, for example accelerometers (e.g., collectively responding to acceleration of the mobile device in three dimensions), one or more gyroscopes or one or more magnetometers (e.g., to support one or more compass applications). Environment sensors of the mobile device may comprise, for example, temperature sensors, barometric pressure sensors, ambient light sensors, and camera imagers, microphones, just to name few examples. The sensors may generate analog or digital signals that may be stored in memory and processed by DPS(s) or processor(s) in support of one or more applications such as, for example, applications directed to positioning or navigation operations.

In a particular implementation, the mobile device may comprise a dedicated modem processor capable of performing baseband processing of signals received and down-converted at a wireless transceiver or SPS receiver. Similarly, the dedicated modem processor may perform baseband processing of signals to be up-converted for transmission by the wireless transceiver. In alternative implementations, instead of having a dedicated modem processor, baseband processing may be performed by a processor or DSP (e.g., processor(s) or DSP(s)).

FIG. 7A illustrates a method of capturing and validating a fingerprint image according to aspects of the present disclosure. In the example shown in FIG. 7A, in block 702, the method determines a set of light sources from a plurality of light sources for emitting light to a fingerprint. In block 704, the method determines a set of sensor zones from a plurality of sensor zones for sensing scattered light from the fingerprint. In block 706, the method emits light from the set of light sources to generate the scattered light from the fingerprint. In block 708, the method senses the scattered light in the set of sensor zones. In block 710, the method may optionally determine a validity of the fingerprint using the scattered light sensed in the plurality of sensor zones. The method may further determine a minimum distance between a light source in the set of light sources and a sensor in the set of sensor zones.

FIG. 7B illustrates a method of determining a set of light sources from a plurality of light sources for emitting light to a fingerprint according to aspects of the present disclosure. In the example shown in FIG. 7B, in block 712, the method determines a minimum distance between the set of light sources to avoid interference in the set of sensor zones. In some approaches, a sensor zone in the set of sensor zones is determined by a region between an inner radius and an outer radius; where the inner radius is a minimum distance away from the light source where the scattered light is sensed, and the outer radius is a maximum distance away from the light source where the scattered light is sensed. According to aspects of the present disclosure, the methods performed in block 712 may further include the methods performed in block 714 and block 716. In block 714, the method determines a separation distance of a buffer zone between the set of light sources beyond the outer radius, wherein intensity of light in the buffer zone is below a predetermined threshold value. In block 714, the method computes the minimum distance to be twice the outer radius plus the separation distance of the buffer zone. In some implementations, the light from the plurality of light sources are emitted from a plurality of pixels or sub-pixels of a pixel panel. The scattered light from the fingerprint is sensed by a plurality of pixels or sub-pixels of a pixel panel.

FIG. 7C illustrates a method of sensing scattered light in a set of sensor zones according to aspects of the present disclosure. In this example, in block 722, the method sets one or more unit cells of the pixel panel in the sensor zone under a reversed bias condition. In block 724, the method detects a leakage current corresponding to the scattered light sensed in the one or more of the pixels or sub-pixels in the one or more unit cells of the pixel panel. In block 726, the method amplifies a signal of the leakage current detected from the one or more of the pixels or sub-pixels. Note that in some implementations, the one or more of the pixels or sub-pixels in the sensor zone can be arranged in the form of a line, the one or more of the pixels or sub-pixels in the sensor zone are arranged in the form of a cross, or any combination thereof.

FIG. 7D illustrates a method of determining a validity of the fingerprint using the scattered light sensed in a plurality of sensor zones according to aspects of the present disclosure. In the exemplary method shown in FIG. 7D, in block 732, the method gathers intensities of the scattered light sensed in the plurality of sensor zones. In block 734, the method determines topography of the fingerprint based on the intensities of the scattered light sensed in the plurality of sensor zones. In block 736, the method compares the topography of the fingerprint to a database of fingerprints to determine whether a match of the fingerprint is found in the database.

FIG. 7E illustrates a further method of capturing and validating the fingerprint image of FIG. 7A according to aspects of the present disclosure. As shown in FIG. 7E, in block 742, the method determines a next set of light sources from a plurality of light sources for emitting light to a fingerprint. In block 744, the method determines a next set of sensor zones from a plurality of sensor zones for sensing a scattered light from the fingerprint. In block 746, the method emits light from the next set of light sources to generate the scattered light from the fingerprint. In block 748, the method senses the scattered light in the next set of sensor zones. In block 750, the method may repeat the methods performed in block 742 to block 748 until an area under the fingerprint is covered.

It will be appreciated that the above descriptions for clarity have described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A method for capturing a fingerprint image, comprising:
    determining a set of light sources from a plurality of light sources for emitting light to a fingerprint;
    determining a set of sensor zones from a plurality of sensor zones for sensing scattered light from the fingerprint based on a minimum distance between a light source in the set of light sources and a sensor in the set of sensor zones;
    emitting light from the set of light sources to generate the scattered light from the fingerprint; and
    sensing the scattered light in the set of sensor zones.

2. The method of claim 1, wherein the determining the set of light sources comprises:
    determining a minimum distance between the set of light sources to avoid interference in the set of sensor zones, wherein a sensor zone in the set of sensor zones is determined by a region between an inner radius and an outer radius; wherein the inner radius is a minimum distance away from the light source where the scattered light is sensed; and wherein the outer radius is a maximum distance away from the light source where the scattered light is sensed.

3. The method of claim 2, wherein determining the minimum distance comprises:
    determining a separation distance of a buffer zone between the set of light sources beyond the outer radius, wherein intensity of light in the buffer zone is below a predetermined threshold value; and
    computing the minimum distance to be twice the outer radius plus the separation distance of the buffer zone.

4. The method of claim 1, wherein the light from the plurality of light sources are emitted from a plurality of pixels or sub-pixels of a pixel panel.

5. The method of claim 1, wherein the scattered light from the fingerprint is sensed by a plurality of pixels or sub-pixels of a pixel panel.

6. The method of claim 5, wherein the sensing the scattered light in the set of sensor zones comprises:
    setting one or more unit cells of the pixel panel in the sensor zone under a reversed bias condition;
    detecting a leakage current corresponding to the scattered light sensed in the one or more of the pixels or sub-pixels in the one or more unit cells of the pixel panel; and
    amplifying a signal of the leakage current detected from the one or more of the pixels or sub-pixels.

7. The method of claim 6 further comprises at least one of:
    the one or more of the pixels or sub-pixels in the sensor zone are arranged in the form of a line; or
    the one or more of the pixels or sub-pixels in the sensor zone are arranged in the form of a cross.

8. The method of claim 1, further comprises:
    determining a validity of the fingerprint using the scattered light sensed in the plurality of sensor zones.

9. The method of claim 8, wherein the determining a validity of the fingerprint using the scattered light sensed in the plurality of sensor zones comprises:
    gathering intensities of the scattered light sensed in the plurality of sensor zones;
    determining a topography of the fingerprint based on the intensities of the scattered light sensed in the plurality of sensor zones; and
    comparing the topography of the fingerprint to a database of fingerprints to determine whether a match of the fingerprint is found in the database.

10. The method of claim 1, further comprises:
    determining a next set of light sources from a plurality of light sources for emitting light to a fingerprint;
    determining a next set of sensor zones from a plurality of sensor zones for sensing a scattered light from the fingerprint;
    emitting light from the next set of light sources to generate the scattered light from the fingerprint;
    sensing the scattered light in the next set of sensor zones; and repeating above steps until an area under the fingerprint is covered.

11. An apparatus for determining validity of a fingerprint, comprising:
- a pixel panel having a surface configured to be touched by a fingerprint;
- a plurality of light sources for emitting light to the fingerprint;
- a plurality of sensor zones for sensing scattered light from the fingerprint;
- a controller including control logic, wherein the control logic includes:
- logic configured to determine a set of light sources from a plurality of light sources;
- logic configured to determine a set of sensor zones from a plurality of sensor zones based on a minimum distance between a light source in the set of light sources and a sensor in the set of sensor zones;
- logic configured to emit light from the set of light sources to generate the scattered light from the fingerprint; and
- logic configured to sense the scattered light in the set of sensor zones.

12. The apparatus of claim 11, further comprises:
- logic configured to determine a validity of the fingerprint using the scattered light sensed in the plurality of sensor zones.

13. The apparatus of claim 11, wherein the logic configured to determine the set of light sources comprises:
- logic configured to determine a minimum distance between the set of light sources to avoid interference in the set of sensor zones, wherein a sensor zone in the set of sensor zones is determined by a region between an inner radius and an outer radius; wherein the inner radius is a minimum distance away from the light source where the scattered light is sensed; and wherein the outer radius is a maximum distance away from the light source where the scattered light is sensed.

14. The apparatus of claim 13, wherein the logic configured to determine the minimum distance comprises:
- logic configured to determine a separation distance of a buffer zone between the set of light sources beyond the outer radius, wherein intensity of light in the buffer zone is below a predetermined threshold value; and
- logic configured to compute the minimum distance to be twice the outer radius plus the separation distance of the buffer zone.

15. The apparatus of claim 11, wherein the light from the plurality of light sources are emitted from a plurality of pixels or sub-pixels of the pixel panel.

16. The apparatus of claim 11, wherein the scattered light from the fingerprint is sensed by a plurality of pixels or sub-pixels of the pixel panel.

17. The apparatus of claim 11, wherein the logic configured to sense the scattered light in the set of sensor zones comprises:
- logic configured to set one or more unit cells of the pixel panel in the sensor zone under a reversed bias condition;
- logic configured to detect a leakage current corresponding to the scattered light sensed in the one or more of the pixels or sub-pixels in the one or more unit cells of the pixel panel; and
- logic configured to amplify a signal of the leakage current detected from the one or more of the pixels or sub-pixels.

18. The apparatus of claim 17 further comprises at least one of:
- the one or more of the pixels or sub-pixels in the sensor zone are arranged in the form of a line; or
- the one or more of the pixels or sub-pixels in the sensor zone are arranged in the form of a cross.

19. The apparatus of claim 11, wherein the logic configured to determine a validity of the fingerprint using the scattered light sensed in the plurality of sensor zones comprises:
- logic configured to gather intensities of the scattered light sensed in the plurality of sensor zones;
- logic configured to determine a topography of the fingerprint based on the intensities of the scattered light sensed in the plurality of sensor zones; and
- logic configured to compare the topography of the fingerprint to a database of fingerprints to determine whether a match of the fingerprint is found in the database.

20. The apparatus of claim 11, further comprises:
- logic configured to determine a next set of light sources from a plurality of light sources for emitting light to a fingerprint;
- logic configured to determine a next set of sensor zones from a plurality of sensor zones for sensing a scattered light from the fingerprint;
- logic configured to emit light from the next set of light sources to generate the scattered light from the fingerprint;
- logic configured to sense the scattered light in the next set of sensor zones; and
- logic configured to repeat above steps until an area under the fingerprint is covered.

21. The apparatus of claim 11, wherein the pixel panel comprises at least one of:
- a thin-film transistor light sensor panel; or
- an active matrix organic light emitting diode light sensor panel.

* * * * *